(12) United States Patent
Zambrana

(10) Patent No.: US 7,421,621 B1
(45) Date of Patent: Sep. 2, 2008

(54) APPLICATION INTEGRATION TESTING

(75) Inventor: Gustavo Zambrana, Mission Viejo, CA (US)

(73) Assignee: Matador Technologies Corp., San Francisco, CA (US)

( * ) Notice: Subject to any disclaimer, the term of this patent is extended or adjusted under 35 U.S.C. 154(b) by 551 days.

(21) Appl. No.: 10/943,778

(22) Filed: Sep. 17, 2004

Related U.S. Application Data

(60) Provisional application No. 60/504,403, filed on Sep. 19, 2003.

(51) Int. Cl.
*G06F 11/00* (2006.01)

(52) U.S. Cl. .......................................... 714/38

(58) Field of Classification Search ................... 714/38, 714/25; 717/124
See application file for complete search history.

(56) References Cited

U.S. PATENT DOCUMENTS

| | | | |
|---|---|---|---|
| 5,781,720 A * | 7/1998 | Parker et al. ................... | 714/38 |
| 6,434,714 B1 * | 8/2002 | Lewis et al. .................... | 714/38 |
| 6,505,342 B1 * | 1/2003 | Hartmann et al. ............. | 717/104 |
| 6,697,967 B1 * | 2/2004 | Robertson ...................... | 714/43 |
| 7,117,484 B2 * | 10/2006 | Hartman et al. ............. | 717/126 |
| 7,127,641 B1 * | 10/2006 | Anderson ...................... | 714/38 |
| 7,210,066 B2 * | 4/2007 | Mandava et al. .............. | 714/38 |

* cited by examiner

*Primary Examiner*—Marc Duncan
(74) *Attorney, Agent, or Firm*—Van Pelt, Yi & James LLP

(57) ABSTRACT

Application testing is disclosed. A definition of a test to be performed on a subject application is received in a generic form not specific to the subject application. The test is performed by exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format.

75 Claims, 18 Drawing Sheets

APPLICATION INTEGRATION TESTING

CROSS REFERENCE TO OTHER APPLICATIONS

This application claims priority to U.S. Provisional Patent Application No. 60/504,403 entitled APPLICATION INTEGRATION TESTING SYSTEM filed Sep. 19, 2003 which is incorporated herein by reference for all purposes.

FIELD OF THE INVENTION

The present invention relates generally to computers. More specifically, application integration testing is disclosed.

BACKGROUND OF THE INVENTION

Integrating disparate software systems often creates difficulties and costs due to complexities in infrastructure. At an enterprise level, integrating software systems requires quality assurance (QA) testing, which is becoming increasingly complex. The increasing complexity of software systems requires that QA test systems and software also have greater capabilities than predecessor applications.

For businesses, testing data systems requires thorough QA testing of integrated systems to ensure that data is properly routed between endpoints on the overall system. As legacy systems may often require integration with newer software systems, effective QA software must be able to test multiple processes and applications of varying types. Conventional QA integration testing software is often superficial as the complexity with testing integrated data systems often covers only the input and output of data for particular graphical user interfaces (GUI). For example, conventional QA integration testing software packages that are designed to be cross-platform compatible are often only capable of testing for the proper input and output of data from system GUIs. Conventional QA integration testing software is typically designed for GUI testing or testing only one particular component application of an overall larger system. Thorough testing of integrated software systems requires in-depth testing and evaluation across the entire platform and its individual and disparate components. This process can be costly if conventional QA integration testing software is used, and may be cost prohibitive if extensive custom coding is required. Moreover, for cost reasons typical testing software systems at present provide only single component coverage via software tools, missing major portions of integrated systems, or is done manually with very marginal coverage.

A large part of the costs associated with conventional QA integration testing software are due to the labor-intensive nature of development and integration. Although conventional "off-the-shelf" packages are produced by many software testing companies, specific integration testing with a particular system requires custom coding. Custom coding, in turn, requires platform-specific knowledge as well as testing application-specific knowledge that, when combined, requires significant labor and time costs.

Thus, what is needed is a solution for thoroughly testing integrated software packages that may be composed of disparate systems. There is a need for a solution for testing integrated software systems that automates manual labor intensive parts of testing. Further, there is a need for a solution for testing integrated software systems without incurring significant custom coding or labor costs.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
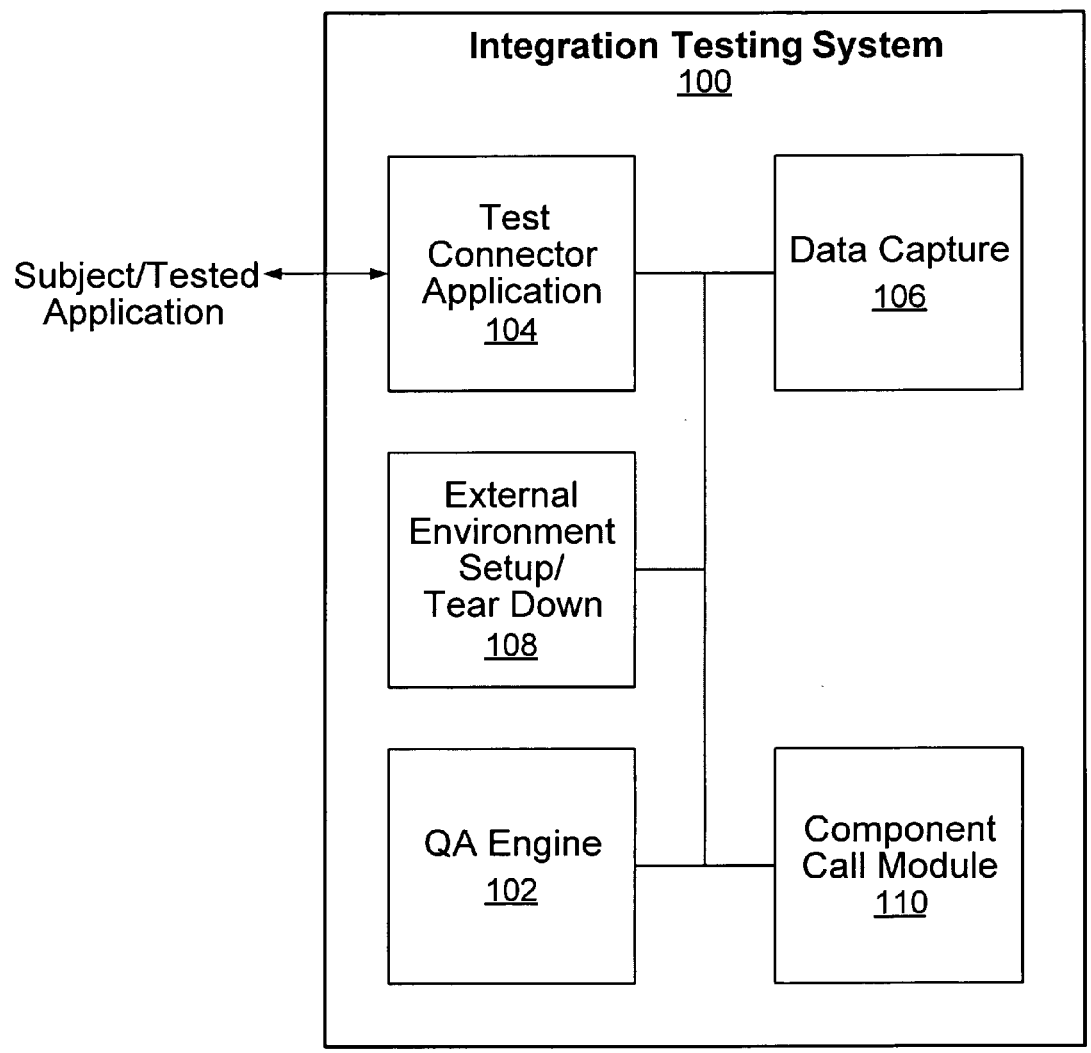
FIG. 1 illustrates an application integration testing system, in accordance with an embodiment of the present invention.

FIG. 1 illustrates an application integration testing system, in accordance with an embodiment. System 100 includes QA engine 102, connector application 104, data capture module 106, external environment setup/tear down module 108, and component call module 110. Cross-communication between QA engine 102, connector application 104, and data capture module 106 enables system 100 to test integrated software applications such as an enterprise, platform, or scaled software system. QA engine 102 is explained in greater detail below in connection with FIGS. 2A and 2B. System 100 enables a test user, designer, or administrator to design, define, and run a test or set of tests.

External environment setup/tear down module 108 provides the initial setup of the testing environment for system 100 with regard to external applications not directly associated with the test, such as by disabling alarms or other features associated with information technology resource monitoring and/or management applications such as Tivoli or OpenView. External environment setup/tear down module 108 also provides for tear down and "clean up" of the external test environment after testing has been completed, such as by reactivating previously-disabled alarms and/or other features. Component call module 110 provides communication capabilities for system 100 to call external (e.g., user-specific) components that are executed subject to rules or policies specified by, for example, a test designer or administrator.

Data is exchanged between system 100 and a subject application via test connector application 104, in this embodiment. In general, various data formats may be used including XML, HTML, or other common data type formats. In one embodiment, one or more custom data type formats may be defined. In one embodiment, a plug-in is used to define a custom data type. Test connector application 104 communicates with test connectors or adapters that are designed to provide a communication interface with various software types, packages, and platforms (e.g., SAP, PeopleSoft, Oracle, Vitria, Tivoli, file systems, FTP, etc.).

In one embodiment, a test connector application 104 (and/or one or more instances of the same connector) is provided for each subject application (and/or instance thereof) with which the system 100 will be required to communicate to perform a test and perform the job of communicating with the application. The connector application 104 understands the low level API/protocol to communicate with the subject application with which it is associated and interface with QA engine 102 and/or other components of system 100 in a standardized, non-application-specific way. In one embodiment, test connector application 104 communicates with QA engine 102 asynchronously using XML messages. In one embodiment, each test connector application 104 comprises a set of custom rules to interface with a given enterprise application. In one embodiment, the custom rules are configured for the following actions: connection properties; the publish properties; the subscriber properties to use; conditions and duration to determine dynamically the behavior for when to connect/disconnect (e.g., how long a test connector communicates with an external application to publish or poll/subscribe for data); application specific setup rules to set up the state of an enterprise application; and application specific tear down rules to clean up the state of an enterprise application. In one embodiment, test connector application 104 provides a data capture module. This data capture module has the functionality to extract data from an external application, which may be use for replaying as inputs or for data comparisons. In one such embodiment data capture module 106 is an integral part of test connector application 104.

In one embodiment, there are three different types of test connector application 104: source connectors, target connectors, and source-target connectors. Source connectors have the functionality of sending data to an application. In general, these types of connectors are used to be the source of inputs into a test. Target connectors have the functionality of retrieving data from an application. The actual process of how the data is retrieved is specific to the application. The purpose of this type of connector is to gather the outputs from an application and send them to QA engine 102 for analysis. Source-target connectors provide the combined logic of a source and target connector. This type of connector is associated with applications that are synchronous, like Web Services over HTTP.

In one embodiment, test connector application 104 is configured to capture baseline data. In one embodiment, test connector application 104 is configured to expose application-specific rules associated with an application involved in a test. For instance, in one embodiment a database test connector is configured to expose application-specific rules such as how long results should be polled for, how many records are expected, poll rate, etc. In one embodiment, an FTP test connector is configured to expose FTP-specific information such as files/directories to delete in a remote FTP server; how long to poll; how long to wait before polling; poll rate; how many files to be downloaded (optional); rules to consider when a file to be downloaded is done (how long should the size/date of the file be fixed before it is considered complete); when a file to be downloaded is always changing, how long to wait before downloading the file once it is initially found; etc. Using test connectors developed for specific software packages, connector application 104 provides sampled and normalized data to system 100. Data can be normalized to XML depending on the test application or left in its original format, to perform integrated QA testing. Data may be gathered from a variety of sources including application programming interfaces (APIs), web services, databases (e.g., Oracle), or other platform enterprise applications (e.g., SAP, PeopleSoft, etc.). Depending on the application with which a connector is associated, data may be received and/or provided by the test connector application in the form of XML or other data, a file, and/or a message or even multi-part (complex) format, a data type with many parts of other data types. In one embodiment, QA engine 102 communicates with test connector application 104 via XML messaging. Data capture module 106 is configured to capture baseline data. In one embodiment, data capture module 106 captures data based on a user-defined test case and obtains the data designated by the user from locations specified by the user.

In one embodiment, test connector application 104 conforms to a standard promulgated by a competent authority or body to specify a format to be used to create standard and/or custom (e.g., plug-in) test connector applications. In one embodiment, the system 100 comprises a workflow or "business process management" engine. In one embodiment, the system 100 is implemented in a J2EE application server.

In one embodiment, system 100 comprises a graphical user interface (GUI), not shown in FIG. 1, to enable a user to create, update, or edit test projects, configure data capture, etc. In one embodiment, system 100 comprises an administration GUI, not shown in FIG. 1, to facilitate management of the system 100, e.g., by adding/removing components (e.g., test connector applications, data types, users, etc.). In one embodiment, system 100 comprises a scheduling GUI, not shown in FIG. 1, to schedule test run times, define data or other dependencies, identify a server in which a test should be run, etc. In one embodiment, dependencies between test projects (and/or other test nodes, described more fully below) may be defined.

Figure 2A:
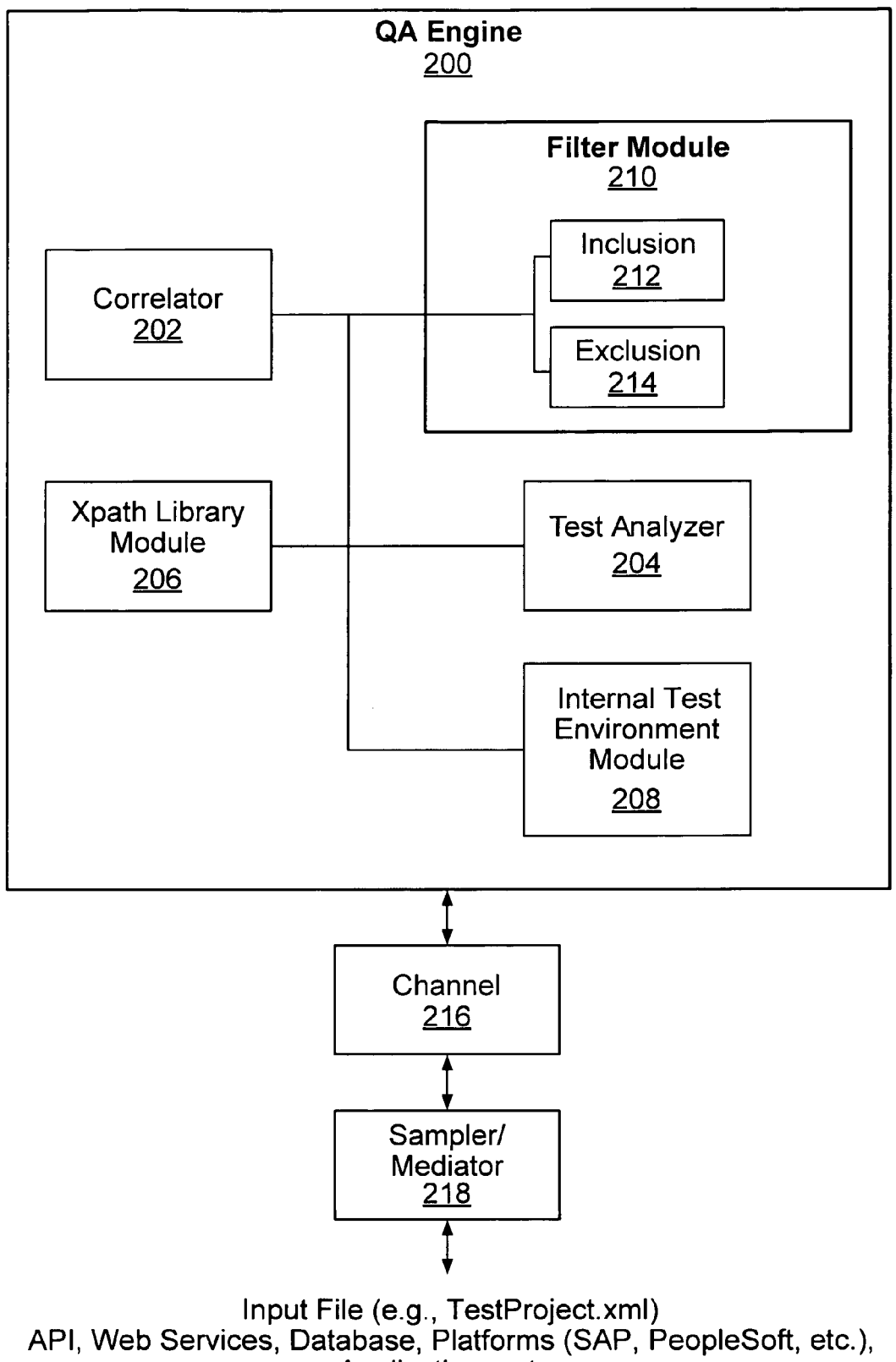
FIG. 2A illustrates a QA engine 200 of an application integration testing system, in accordance with an embodiment.

FIG. 2A illustrates a QA engine 200 of an application integration testing system, in accordance with an embodiment. In one embodiment, QA engine 200 is used to implement QA engine 102 of FIG. 1. QA engine 200 includes correlator 202, test analyzer 204, XPATH library module 206, internal test environment module 208, and filter module 210. Filter module 210 also includes inclusion filter 212 and exclusion filter 214. For data communication between QA engine 200 and other components, such as test connectors used by QA engine 200 to exchange data with one or more applications being tested, channel queue 216 is shown with sampler/mediator 218. In one embodiment, there is a separate test connector application 104 for each different application with which interaction is required to perform a test and/or possibly multiple instance of the same connector. In one such embodiment each test connector and/or instance thereof has associated with it a channel such as channel 216.

In this example, QA engine 200 provides logic capabilities for various functions performed by application integration testing system 100. In one embodiment, correlator 202 correlates runtime data from an integrated application undergoing testing with corresponding baseline data. In one embodiment, this correlation is performed by normalizing the runtime data to a common format (e.g., XML) and applying a predefined correlation rule or process to identify the corresponding baseline data. Correlation may be based on data fields configured as part of the control parameters for system 100 (e.g., "date," "time," "number," "type," etc.). In one embodiment, a test engineer or other user or process provides an identification of or path to the baseline data corresponding to an element of runtime data, e.g., using an XPATH expression. In one embodiment, correlator 202 may be configured to assume data is provided as output at runtime in the same sequence as it was provided when the baseline data was captured, and correlation is based on this assumption. In some embodiments, QA engine 202 may perform one or more tests or operations that do not involve or require comparison to baseline data. In one such embodiment, QA engine 200 may be configured to validate runtime data against one or more applicable validation rules, as described more fully below. In an embodiment, test, or operation in which a comparison to baseline data is not required or performed, correlator 202 plays no role.

In one embodiment, test analyzer 204 provides a comparison feature of baseline data to run-time output data to ensure proper operation of an integrated application undergoing testing. In one embodiment, test analyzer 204 may be configured to compare only selected data fields or elements so as to ignore differences that would not indicate an error, such as different time stamps. In an embodiment, test, or operation in which analysis other than comparison to baseline data is involved, test analyzer 204 may be configured to validate runtime data by applying one or more applicable validation rules. In one embodiment, validation rules may be applied to runtime data using a validator module not shown in FIG. 2A. XPATH library module 206 provides reference data in the form of libraries in order to aid the performance of correlator 202, test analyzer 204, and filter module 210. In one embodiment, XQUERY or another alternative and/or successor to XPATH is used. XPATH library module 206 may be a library storing XML path language to assist in the parsing of XML-based data. Other libraries may be included within XPATH library module 206 that aid in parsing formats other than XML.

Internal test environment module 208 provides several capabilities that enable testing to occur by performing tasks required to set up with respect to the application to be tested the initial conditions required for testing and/or to clean up with respect to the tested application after testing. For example, removal of persistent XML data associated with an application to be tested prior to testing may be performed by internal testing environment module 208 in order to ensure that inaccurate test results do not occur.

In order to provide accurate and thorough testing of various software cases (e.g., one input to one output, one input to many output, many inputs to one output, many inputs to many outputs), filter module 210 is provided in addition to correlator module 202. An inclusion filter 212 ensures that the proper data inputs are provided to QA engine 200. Likewise, exclusion filter 214 ensures that unnecessary outputs are not used by QA engine 200. In one embodiment, correlator module 202 provides the matching capabilities to determine which runtime output goes with which baseline output in order to be compared. In one embodiment, this ensures that runtime outputs are correlated with the correct corresponding baseline data for comparison, even if the runtime outputs arrive in different order from test run to test run for the same input, such as may occur, for example, in asynchronous enterprise applications, like MQ, JMS, VITRIA, TIBCO and other message based systems. External communication between QA engine 200 and an integrated application undergoing testing may be provided by channel queue 216, which retrieves data from the integrated application via sampler/mediator 218.

In some embodiments, QA Engine 200 works with applications that generate data in the form of messages (e.g., JMS, Web Services, IBM Message Queue), as well as XML, EDI, ASCII, binary data, and other data. Additionally, QA engine 200 works with applications that generate files as output or use files as input data. In one embodiment, test analyzer 204, correlator 202, and filter module 210 (including inclusion filter 212 and exclusion filter 214) include logic for handling different data formats, in order to ensure proper handling of tested applications that are not able to generate XML output. In other words, testing flexibility is included in these components in order to handle data that is not XML and allow QA engine 200 to operate. In one embodiment, test analyzer 204 comprises several comparison engines. In one such embodiment, test analyzer 204 comprises the following comparison engines: XML Compare, ASCII Compare, Binary Compare, EDI Compare, JMS Compare, and Message Compare. In one embodiment, additional custom data type comparison modules (e.g., plug-ins) may be included in QA engine 200 to support additional custom rules for comparing and/or validating a given data type. Like specific data type comparison/validation engines, such additional custom data type comparison modules include counterparts for correlation and filtering, which in one embodiment also are added for custom data types via a plug-in or other mechanism. In some embodiments, it is not necessary to convert ASCII, binary or other forms of data in order for QA engine 200 to operate. QA Engine 200 can use ASCII, binary, or other forms of data for base comparisons, but data in ASCII, binary, or other forms may be limited in terms of the fidelity of the comparison/validation. ASCII, binary, or other forms of data may be in any format, and QA engine can determine differences between runtime data in a variety of formats and corresponding baseline data. In some embodiments, custom data type plug-in objects may enable special comparison, correlations, filtering, transformation (e.g., decryption), and other functions using ASCII data, binary data, and/or data in custom (non-standard) data type formats. However, if data is output in a standard data type format (e.g., in one embodiment, XML, ASCII, EDI, or JMS), then no custom plug-in is necessary for the operation of QA engine 200. In one embodiment, a custom data type plug-in is required only to enable processing of many inputs to many outputs or one input to many outputs test case, where the data arrives asynchronously and/or is known to vary in order from test run to test run. In one embodiment, a custom data type plug-in is required if the data is not of a standard type and the fidelity of the comparison/validation rules is required to go down to the field level. In such an embodiment, the data must be converted, e.g., using a custom data type plug-in, to and from XML and/or another form in which such field level analysis may be performed with the required fidelity.

In one embodiment, data may be of a complex data type. For example, in some cases complex data types may include metadata and/or multiple parts, one or more of which may comprise data of different types. In one embodiment, a complex data type may be a standard complex data type that the QA engine 200 is configured to recognize and process, e.g., by parsing the complex data to extract the component parts required for processing. In one embodiment, custom complex data types may be defined, including without limitation by defining custom comparison, correlation, filtering, and/or transformation plug-ins for such custom complex data types.

QA engine 200 provides capabilities for designing tests in an enterprise integrated environment. Unlike conventional QA techniques, QA engine 200 is not restricted in the number of enterprise applications that can be used to design, implement, perform, or analyze a test. N number of applications may be operated upon by QA engine 200 and system 100.

In one embodiment, QA Engine 200 is configured to perform functional testing of various components, regardless of system design, in order to determine whether the business functionality provided is executing properly. QA engine 200 also determines in one embodiment when a system change that results in an error (e.g., operation, environment, configuration, etc.) occurs in an application. If so, QA engine 200 can provide a test result summary that precisely determines where the error began and its location in the tested applications involved in an integrated test.

In one embodiment, QA Engine is designed and may be configured to handle one or more of various types of QA tests, including, but not limited to the following:

a. Regressional QA. By recording a baseline data set for input and outputs, system 100 can performed tests using the baseline input and compare test results (i.e., outputs generated at test run time) against the baseline outputs. Baseline data can be referenced from the test definition (e.g., an XML configuration file or other specified file) or in a manner independent of location (e.g., file system, database, LDAP server, etc.).

b. Functional QA. Allow the test designer to apply n number of validation rules to validate the runtime output data from an application being tested. In one embodiment, the validation rules that can be applied against one or more fields; can be any of the following: permitted/expected range of values; list of permitted/expected values; regular expression; mathematical operator-defined (e.g., greater than X, less than Y, not equal to Z); stream validation using text search engines like Lucene; date validation rules for any fields (including in one embodiment date range, date operation, date in a list of known dates, and user-defined date rules with relative date parameters, e.g., a rule requiring that the value of a particular date field be equal to the current day's date whenever the test is run); or custom JAVA class (or similar) to validate a specific field or set of fields.

c. Performance Testing. If a specific time frame has been provided in which to execute a test, system 100 and QA engine 200 ensure that a functional QA test is completed within a specified time frame. In one embodiment, if a specified time frame is exceeded, a failure is noted, and the test is either continued to completion or is stopped based on a user's preference, rule, or policy, as defined in the test definition. In other embodiments, other criteria may be used to indicate successful or failed test results.

d. Stress Test. QA engine 200 can run a functional QA test n number of times and, for every run, apply rules or policies specified for functional QA testing.

e. Robustness Testing. These types of tests include those tests where the test objective is to determine how a particular application or an integrated set of applications respond to different types of inputs. Given a baseline input or set of inputs, a test designer, using QA engine 200 and system 100, can vary any of the inputs into system 100, prior to running tests. The following types of input changes are examples of what a test designer, user, or administrator may define in a test (or test project comprising multiple tests) in one embodiment:

i. Change the value of an input parameter between a min and max value, incrementing with value n, for a given variable type.

ii. Change the value of an input parameter with a set of values, where the test designer selects particular values (e.g., gold, platinum, silver, etc.).

iii. Change the value of an input parameter by QA engine 200 generating a random value, between a min and max value for a given variable type.

iv. Change the value of an input by varying with values from data located in a designated file/database table.

v. Change the value of an input by specifying a custom java class, which will provide a list of values.

f. Test Chaining. In a group of tests in which an input required to be provided for a one test is dependent dynamically on the value of a test runtime output generated by another test, the system may be configured to run the tests sequentially and update the dynamically dependent input prior to running the test with which the input is associated.

g. Test Include. A specified location (e.g., file directory, database) may be searched for test-associated files (e.g., test definition files, test projects comprising multiple test nodes, etc.) that satisfy specified criteria (e.g., all test projects in a particular directory; all test projects within a directory that satisfy a specified regular expression, all test projects that appear on a provided list of test projects, etc.).

The above paragraphs a-g describe examples of various types of tests that can be performed in one embodiment, but in other embodiments other tests not listed above may be performed. In one embodiment, the user defines the tests to be performed by system 100 via one or more XML or other configuration file, referred to in one embodiment as a "test project" configuration file. In this manner, the system can perform tests throughout an integrated set of applications without writing any custom code (e.g., plug-in) in java, c, c++, perl, etc.

Figure 2B:
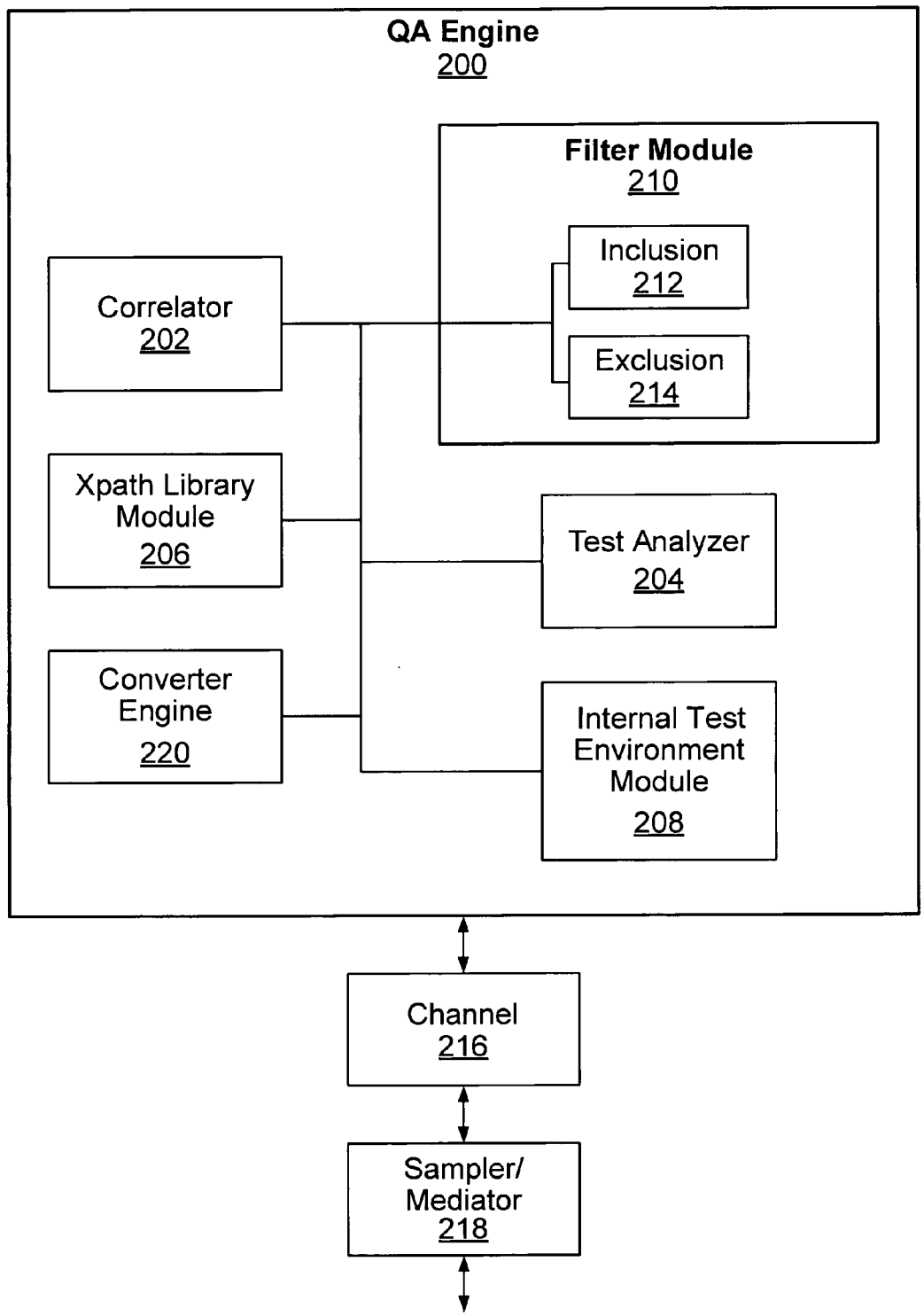
FIG. 2B illustrates a QA engine of an application integration testing system, in accordance with an embodiment.

FIG. 2B illustrates a QA engine of an application integration testing system, in accordance with an embodiment. In this example, QA engine 200 and its components are similar to those discussed in connection with FIG. 2A. In this embodiment, converter engine 220 is also included with QA engine 200. Converter engine 220 allows, for example, a test designer to convert proprietary data in various formats (e.g., ASCII, Binary, etc.) to XML. This normalized data is then provided to QA engine 200 to enable consistent testing of all tested application components. In one embodiment, converter engine 220 converts custom data type formats, defined as described above, to XML, e.g., to facilitate field-level comparison and/or validation.

Figure 3:
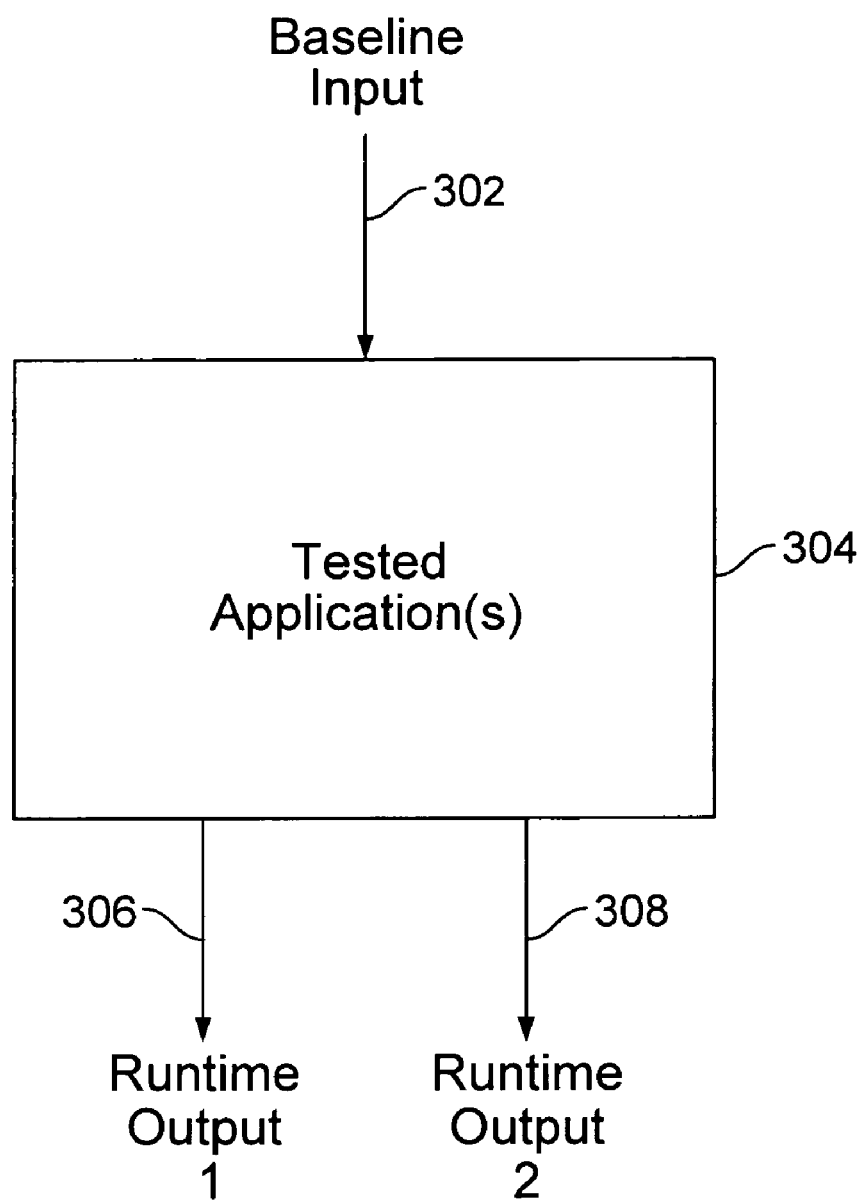
FIG. 3 is a block diagram illustrating application testing as implemented in one embodiment.

FIG. 3 is a block diagram illustrating application testing as implemented in one embodiment. In the example shown, a baseline input 302 is provided to a tested application (or set of applications) 304. The tested application(s) 304 generate test run time outputs 306 and 308. In one embodiment, the runtime outputs 306 and 308 are supplied to a QA engine for analysis as described herein. In one embodiment, the runtime outputs 306 and 308 are correlated with and compared to corresponding baseline values. If the runtime values deviate from the baseline values, responsive action (e.g., notify a user that the test result is "fail") is taken.

Figure 4:
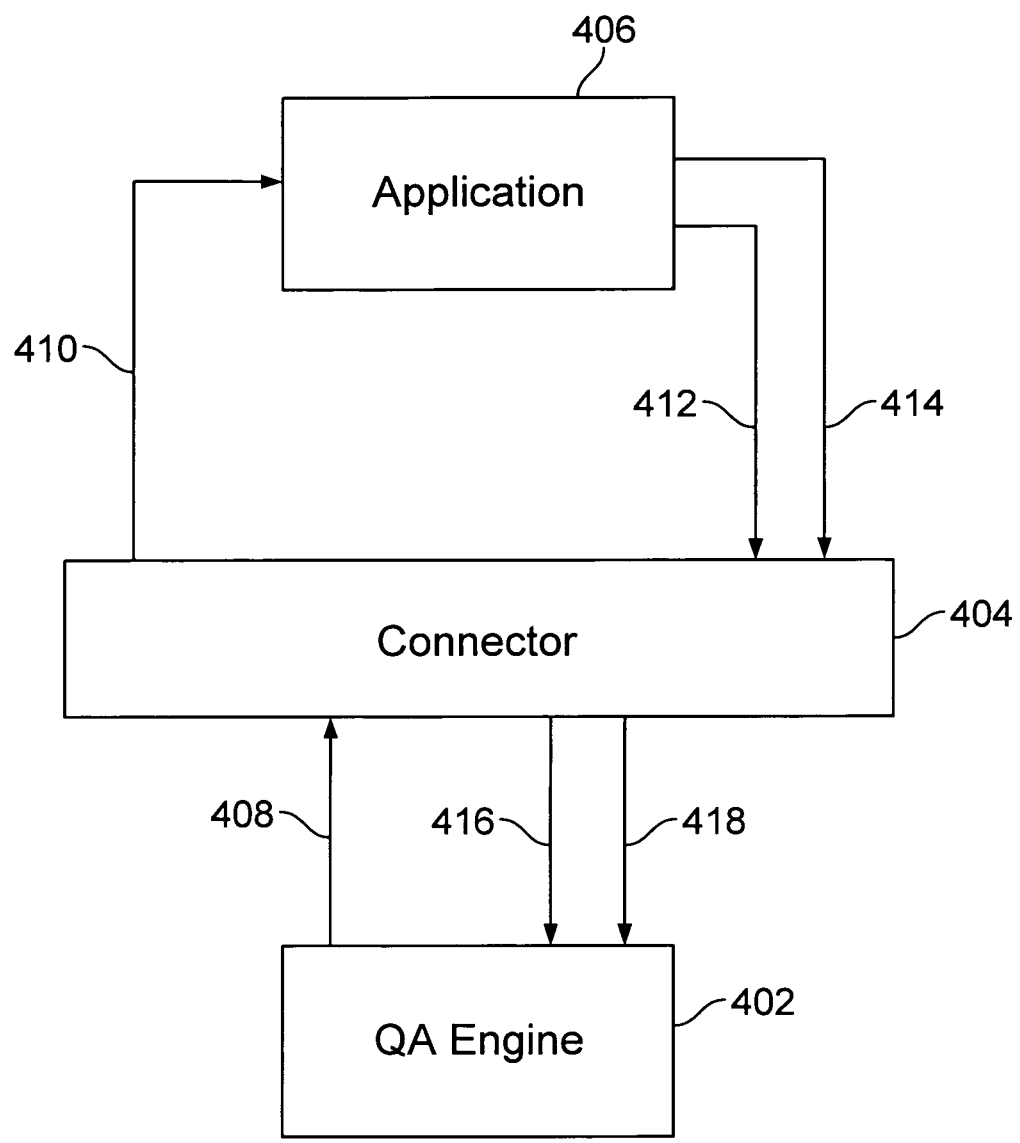
FIG. 4 is a block diagram illustrating application testing as implemented in one embodiment.

FIG. 4 is a block diagram illustrating application testing as implemented in one embodiment. A QA engine uses a test connector 404 to exchange data with a tested application (or set of applications) 406. In one embodiment, test connector 404 is an instance of a test connector application such as described above in connection with test connector application 104 of FIG. 1. QA engine sends a command (or baseline input data) 408 to connector 404, in response to which test connector 404 provides a test input 410 to application 406. In one embodiment, test connector 404 converts baseline input data associated with 408 into a format suitable for application 406 and provides the data to application 406 via a communication link. Application 406 performs operations based on input 410 and generates test run time outputs 412 and 414. Runtime outputs 412 and 414 are provided to (and/or obtained by, depending on the application and/or configuration) test connector 404, converted (if necessary) and normalized (if necessary) by test connector 404 into a format suitable for use by QA engine 402 (e.g., XML, ASCII, etc.), and provided to QA engine 402 as normalized test runtime outputs 416 and 418.

Figure 5:
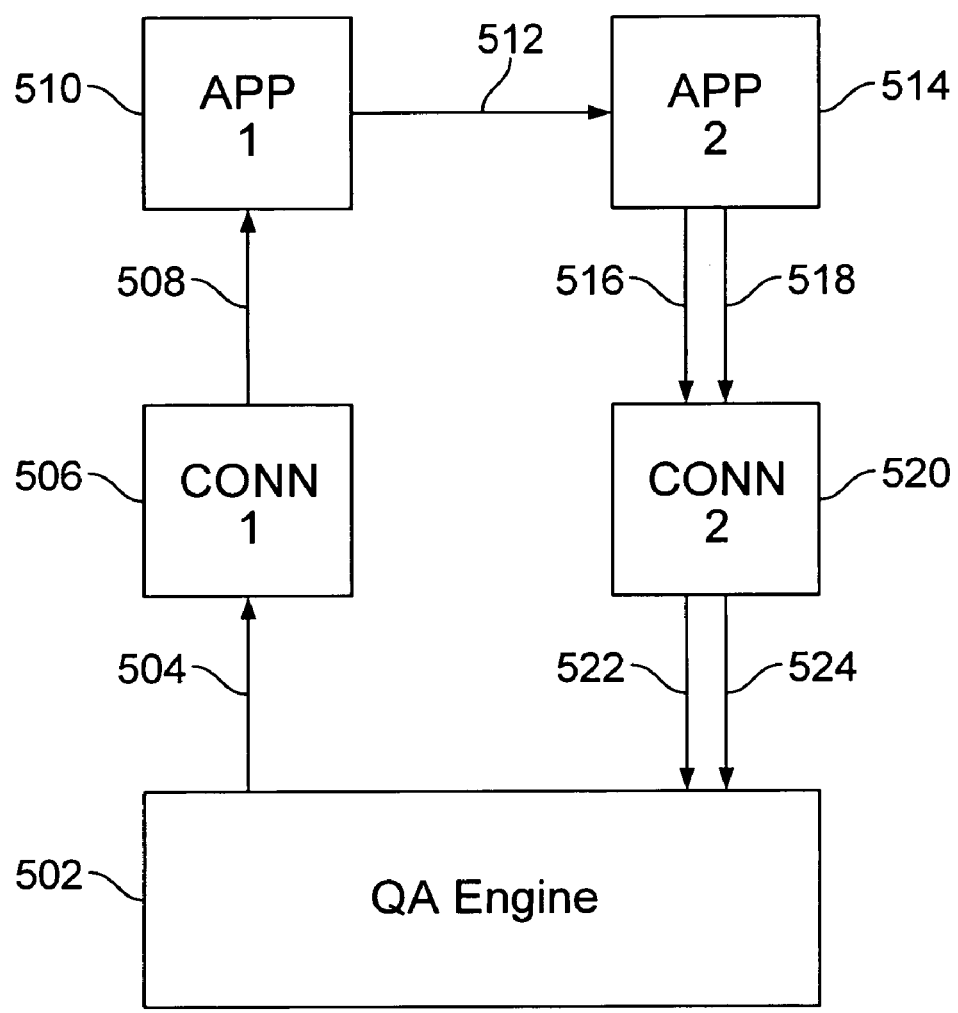
FIG. 5 is a block diagram illustrating application testing as implemented in one embodiment.

FIG. 5 is a block diagram illustrating application testing as implemented in one embodiment. In this example, two applications are involved in the test. A QA engine 502 provides a command (or baseline or other input data) 504 to a first test connector 506, which converts the data into input data 508 provided to a first application 510 in a form suitable for use by first application 510. First application performs operations based on input data 508 and generates intermediate output data 512, which is provided as input to a second application 514. Second application 514 in turn operates on input 512 and generates test runtime outputs 516 and 518. Test runtime outputs 516 and 518 are provided to (or obtained by, e.g., by polling) a second connector 520, which in turn converts and normalizes the test runtime outputs 516 and 518, as required, and provides them to QA engine 502 as normalized test runtime outputs 522 and 524. QA engine 502 in one embodiment compares normalized test runtime outputs 522 and 524 to corresponding values in a set of baseline data, as described herein.

In the examples shown in FIGS. 3-5, one input generates many (specifically in these examples two) outputs, but the approaches described herein may be used in other situations as well, e.g., many inputs to many outputs, one input to one output, many inputs to one output, etc. In addition, the examples shown in FIGS. 3-5 are for purposes of illustration only, and are presented solely to provide specific, concrete examples of the application testing approaches and techniques described herein, which are applicable generally and can be used and/or configured as applicable to test any application or combination thereof in any configuration, within the complete control of a test engineer or other user. In one embodiment, all that is required for the techniques described herein to be used to test a particular application or set of applications is a configuration file that defines the tests to be performed, the location of the components with which the testing system will exchange data, and one or more connector applications or modules capable of exchanging data between the testing system and the application(s) with which the testing system will be required to exchange data to perform the test.

Figure 6:
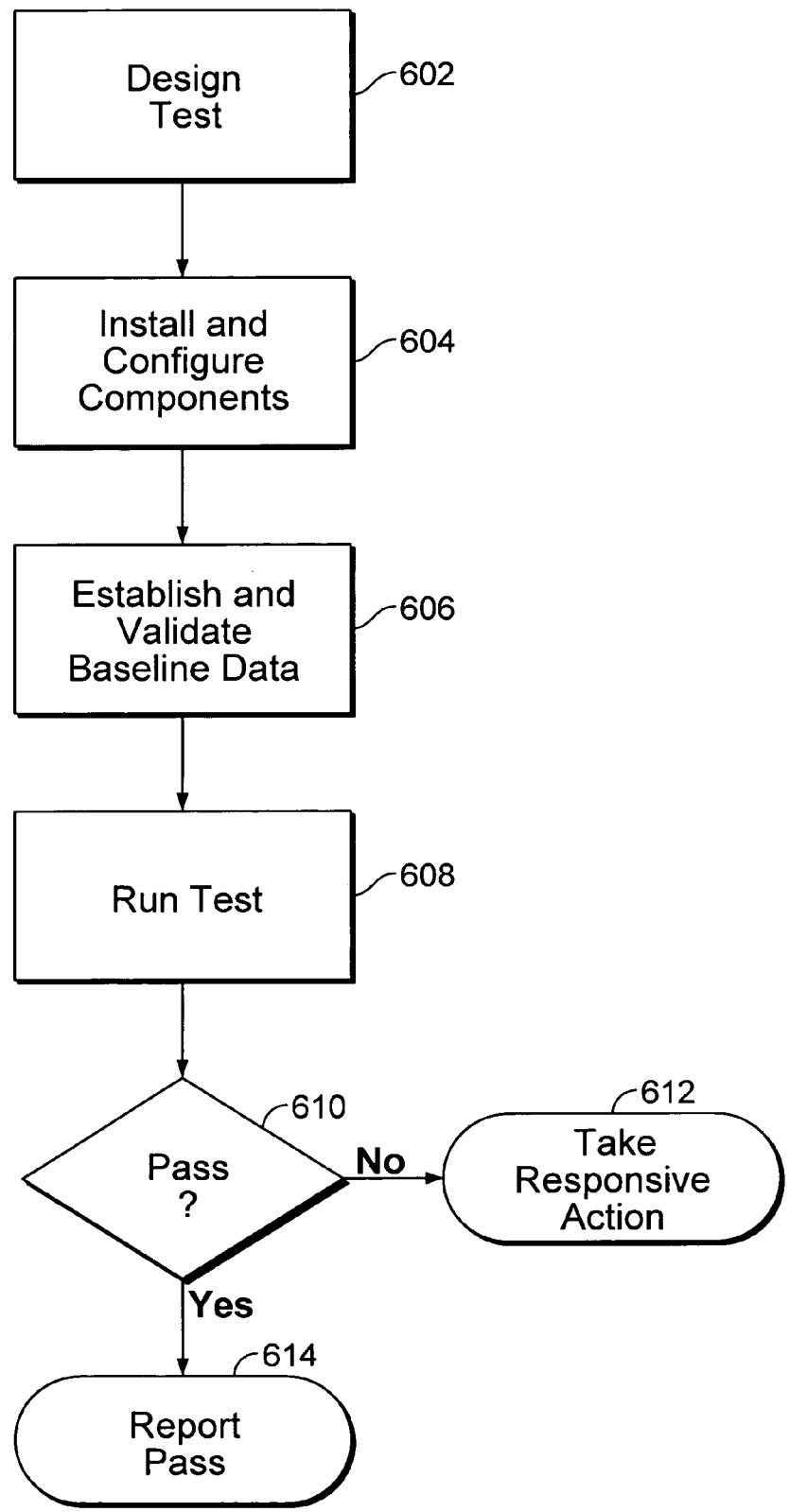
FIG. 6 is a flow chart illustrating a process used in one embodiment to design and run a test in which runtime outputs are compared to baseline data.

FIG. 6 is a flow chart illustrating a process used in one embodiment to design and run a test in which runtime outputs are compared to baseline data. In 602, the test is designed. In one embodiment, a test engineer or other user identifies the components, processes, and/or functions to be tested and determines the data inputs and outputs to be controlled, monitored, and/or analyzed to determine if the subject components, processes, and/or functions are performing properly. In one embodiment, 602 includes preparing an XML configuration file that defines the components to be tested and the tests to be performed. In 604, required test system components are installed and/or configured, as required. In one embodiment, 604 may include installing and/or configuring an application-specific test connector application for each application with which the test system will be required to exchange data. In one embodiment, a user is provided with a library of application-specific test connectors each associated with one or more specifically supported applications and 604 includes a user selecting from the library and installing one or more application-specific test connectors associated with the application(s) to be tested. In one embodiment, the required application-specific test connector(s) may be selected and installed automatically, e.g., by logic configured to select and install the required test connectors based on information provided by a user regarding an application to be tested and/or information discovered automatically. In one embodiment, 604 may include identifying, defining, and/or configuring communication channels between a QA engine and one or more connectors and/or between one or more test connectors and the subject application with which they are associated. In 606, baseline data is established and validated. In one embodiment, a test case defined by a test engineer and/or other user is run and the inputs provided and outputs generated during the running of the test case are captured and stored as baseline data. The baseline data is then validated, to ensure the data represents the normal and expected operation of the application(s) to be tested. At 608, the test is run at run time. For example, the test may be run periodically to ensure the continued error-free operation of the subject application(s). Or, the test may be run after a change to the subject application(s) and/or the host systems on which they are installed, such as installation of a software patch or upgrade. The results of the test are evaluated at 610. If the subject application failed the test, at 612 responsive action is taken. In one embodiment, the responsive action comprises generating and sending a notification. In some embodiments, 612 may comprise further processing to pinpoint if possible the cause of failure. If the subject application performed satisfactorily, at 614 a "pass" result is reported and the process ends. In one embodiment, both 612 and 614 include writing test results to a location (e.g., file, directory, other user specified location). In one embodiment, test results are created in XML or any data format suitable for making such results available to a user, such as HTML, PDF, etc. In one embodiment, errors and/or failures identified during testing are associated in the test results with a test connector application with which the result is associated, thereby facilitating localization and troubleshooting of the cause of the error or failure. In one embodiment, analyzing test runtime data in XML facilitates more precise localization of the cause of an error or failure.

Figure 7:
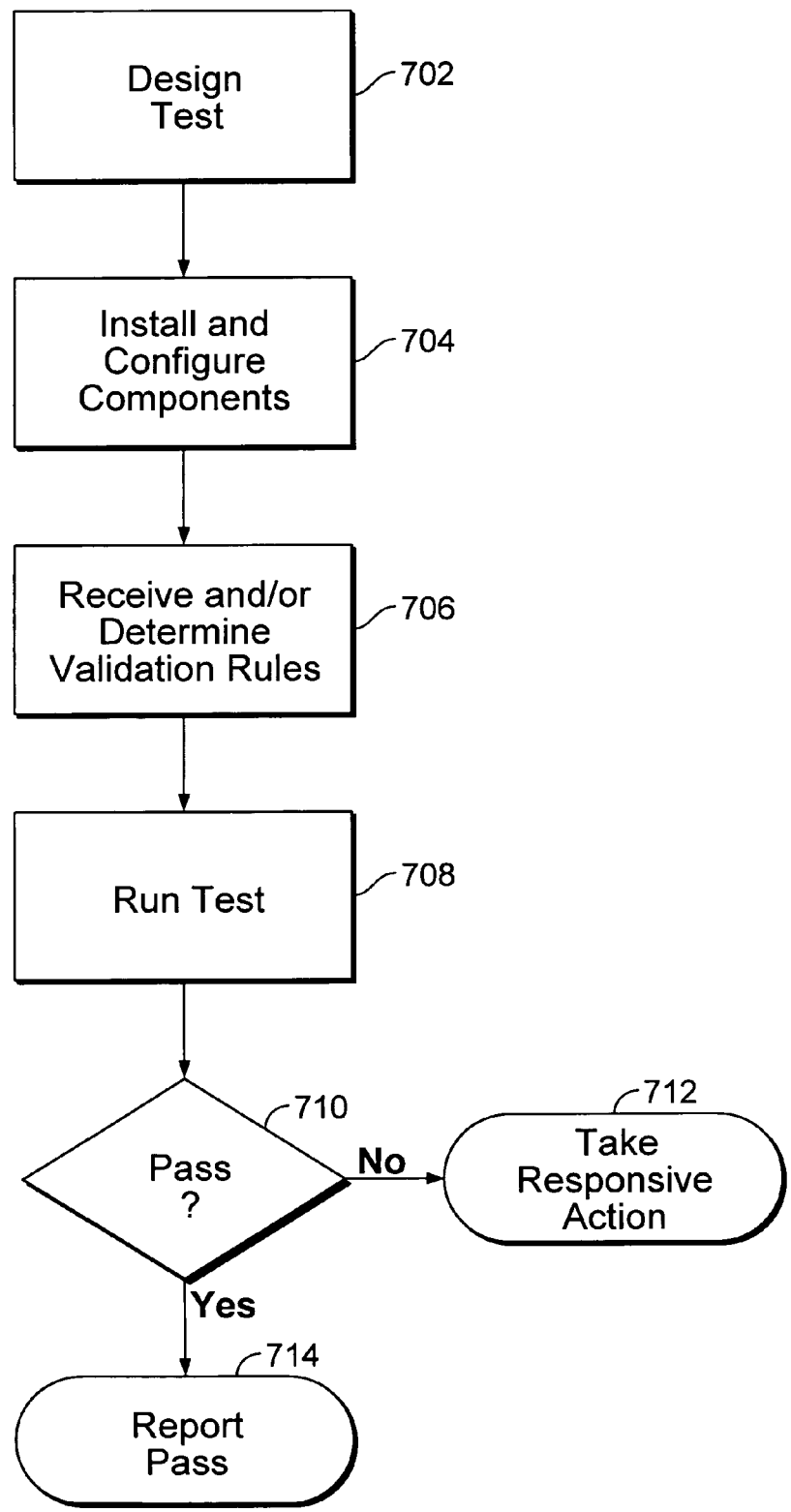
FIG. 7 is a flow chart illustrating a process used in one embodiment to design and run a test in which runtime outputs are validated by applying one or more validation rules.

FIG. 7 is a flow chart illustrating a process used in one embodiment to design and run a test in which runtime outputs are validated by applying one or more validation rules. In 702, the test is designed. In 704, required test system components are installed and/or configured, as required. At 706, validation rules to be used to validate test runtime data are received and/or determined. In one embodiment, the validation rule(s) may be defined by a test engineer and/or other user, e.g., in an XML or other configuration file. In one embodiment, a test case is run and the testing system is configured to capture one or more runtime outputs generated during a run of the test case and derive from the test case runtime outputs one or more validation rules to be applied to corresponding output data generated during subsequent test runs. At 708, the test is run at run time. In one embodiment, one or more elements of output data generated at runtime are validated using one or more of the rules received and/or determined at 706. The results of the test are evaluated at 710. If the subject application failed the test, at 712 responsive action is taken if configured. In one embodiment, the responsive action comprises generating and sending a notification if configured. In some embodiments, 712 may comprise further processing to pinpoint if possible the cause of failure. If the subject application performed satisfactorily, at 714 a "pass" result is reported and the process ends. In one embodiment, both 712 and 714 include writing test results to a location (e.g., file, directory, other user specified location).

Figure 8:
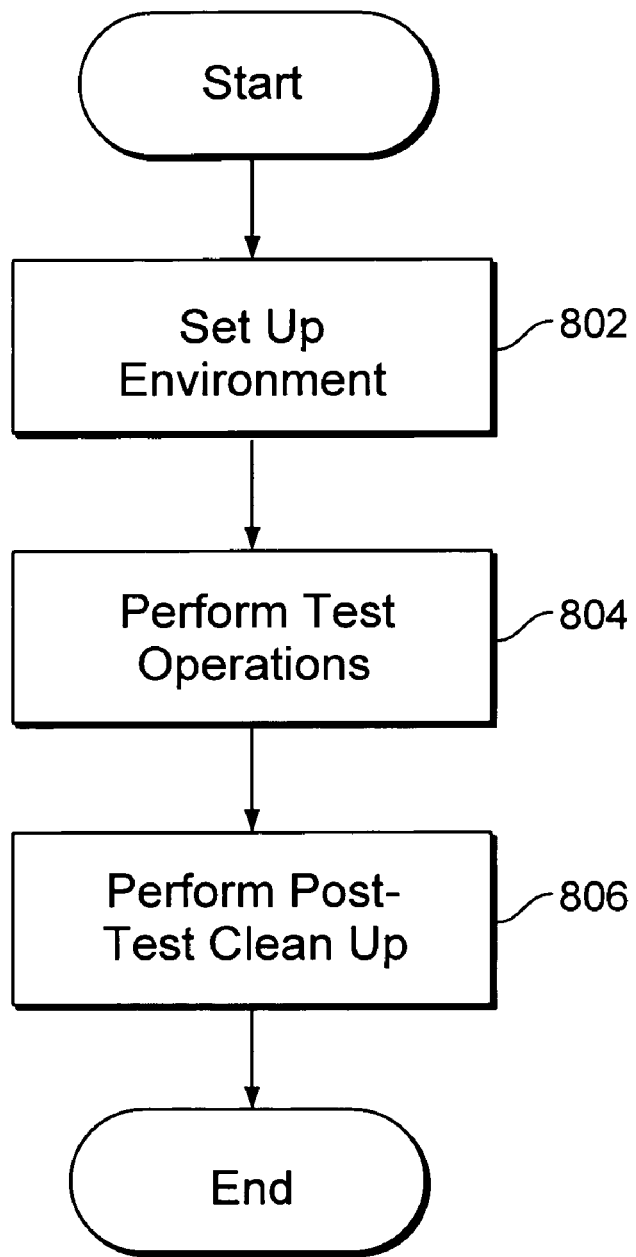
FIG. 8 is a flow chart illustrating a process used in one embodiment to run a test.

FIG. 8 is a flow chart illustrating a process used in one embodiment to run a test. In one embodiment, the process of FIG. 8 is used to implement 608 of FIG. 6. In one embodiment, the process of FIG. 8 is used to implement 708 of FIG. 7. At 802, any actions required to set up the testing environment are performed. In one embodiment, such actions may include creating, storing, changing, and/or deleting one or more items (e.g., data, database record, file, etc.); starting or stopping an application program and/or processing required to be in a particular state at test time; etc. In 804, the test operations that comprise the test are performed. Depending on the configuration and the design and implementation of the particular test being run, the test operations may include in one embodiment providing (via a test connector) one or more inputs to one or more subject applications (i.e., applications that are being tested); receiving output (via a test connector) from one or more subject applications; and/or analyzing received runtime data (e.g., by comparing it to corresponding baseline data, validating it using one or more validation rules, etc.). At 806, post-test clean up is performed, after which the process ends. In one embodiment, such post-test clean up may include deleting data records, files, and/or other items generated during the testing; restoring data records, files, and/or other items to the state (e.g., value) in which they were before the test was run; etc.

Figure 9:
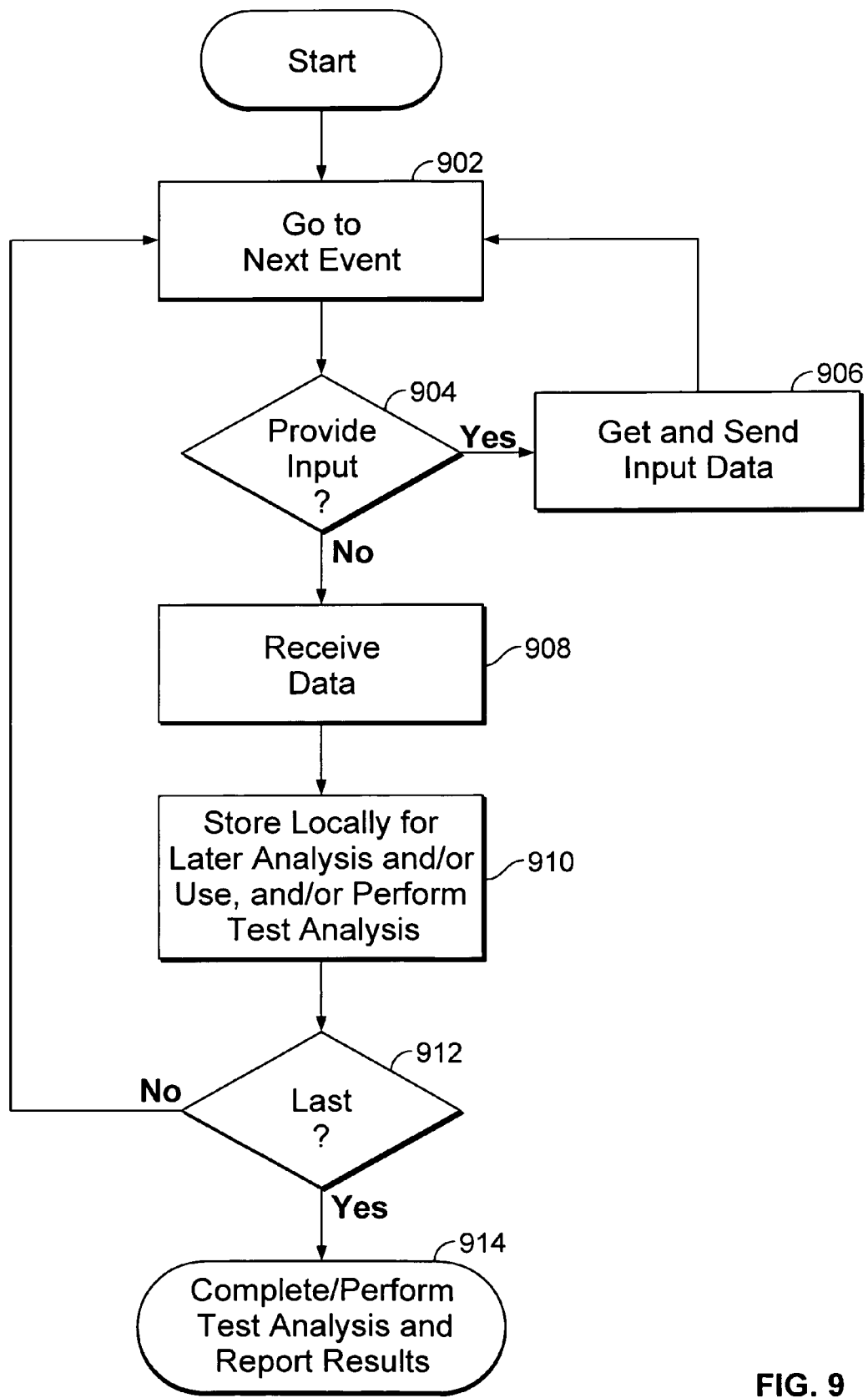
FIG. 9 is a flow chart illustrating a process used in one embodiment to perform test operations.

FIG. 9 is a flow chart illustrating a process used in one embodiment to perform test operations. In one embodiment, the process of FIG. 9 is used to implement 804 of FIG. 8. At 902, information required to perform the next test operation event is retrieved and processed. If the event requires that one or more inputs be provided to one or more subject applications (904), the required input data is retrieved and sent to the subject application(s) in 906 and the processing advances to the next test operation event at 902. Otherwise, test runtime output data is received at 908. In 910, the test runtime output data is stored locally for later analysis and/or use (e.g., to update an input to be provided to a subject application in a later event and/or test) and/or is analyzed in real time, depending on the embodiment and/or configuration, such as by comparing the runtime output to corresponding baseline data and/or validating the runtime output using one or more applicable validation rules. If the test operation event just completed was the last operation of the test (912), at 914 any required analysis of received test runtime output data is completed and the test results are reported. Otherwise, the processing advances to the next test operation event at 902, after which the process repeats for each test operation event until all operations comprising the test have been completed. In other embodiments, one or more test operation events comprising a test may involve processing other than and/or in addition to providing inputs and/or receiving and analyzing test runtime output data, e.g., starting or stopping a system, application, or process required to be started or stopped at prescribed points in the test, etc.

Figure 10:
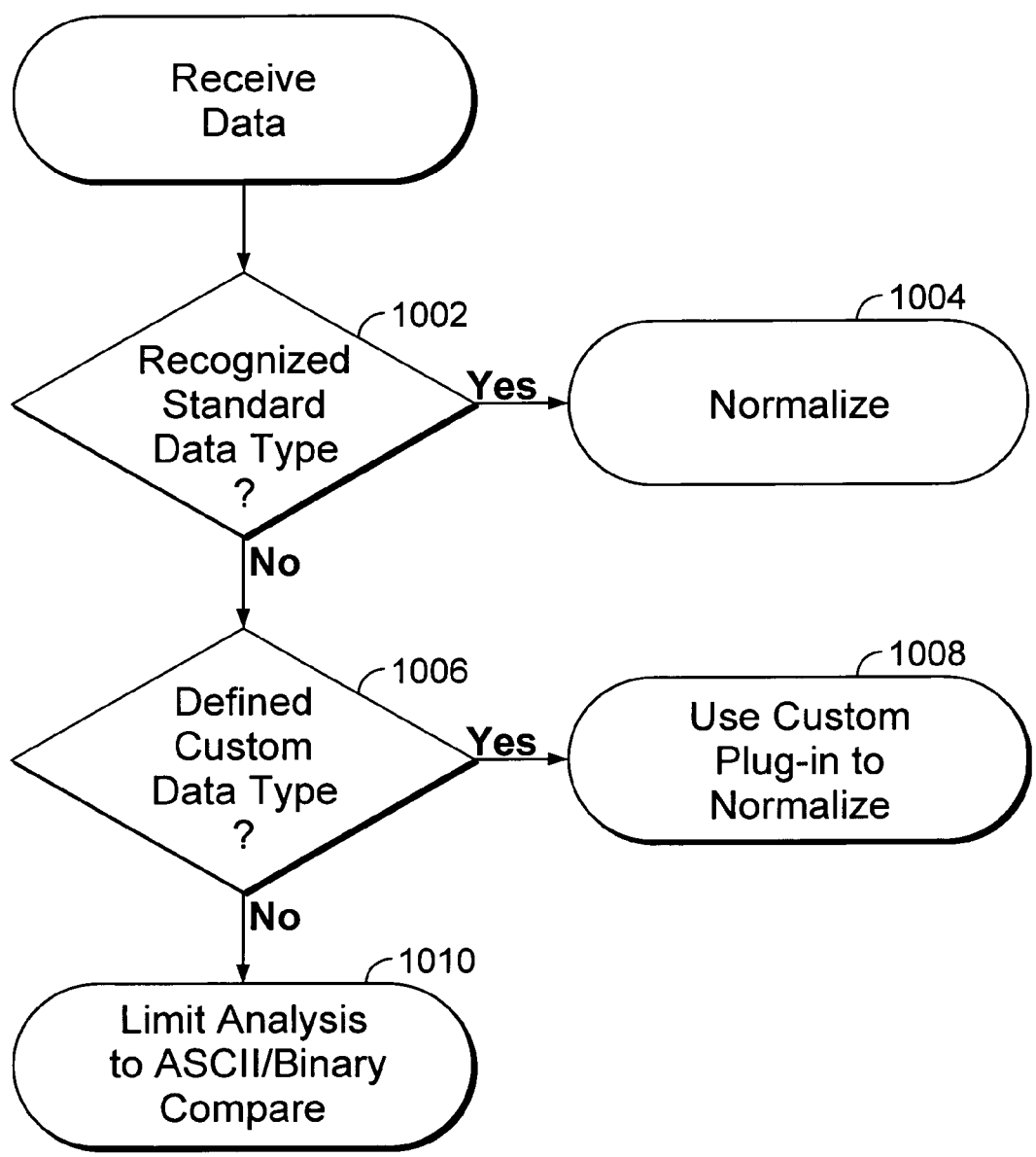
FIG. 10 is a flow chart illustrating a process used in one embodiment to receive data associated with a test.

FIG. 10 is a flow chart illustrating a process used in one embodiment to receive data associated with a test. In one embodiment, the process of FIG. 10 is used to implement 908 of FIG. 9. At 1002, it is determined whether the received data is a recognized data type. If so, the received data is normalized at 1004. In one embodiment, the preferred data format is XML and all data that is not in XML is converted to XML if possible. In one embodiment, complex data types, e.g., JMS messages or others that may comprise data of two or more different types, are normalized by converting each portion, to the extent possible, to a common XML format. In one embodiments, a test platform is configured, e.g., by installing a testing application so configured, to recognize one or more data types in formats other than XML, e.g., EDI, and convert such data into XML data that conforms to a schema associated with the test platform and/or application. If the received data is determined at 1002 to be something other than a recognized standard data type, at 1006 it is determined whether the data is of a defined custom data type. In one embodiment, a user may define one or more custom data types by defining a custom data type plug-in (implemented in Java, or similar language) that enables the test platform and/or application to recognize the custom data format and convert data received in that format to XML data that conforms to a schema and/or custom data type definition associated with the test platform and/or application. If the received data is determined at 1006 to be of a defined custom data type, at 1008 the JAVA conversion class (or other plug in, depending on the embodiment) associated with the custom data type is used at 1008 to normalize the data to the preferred format, e.g., XML. If the data is neither of a recognized standard type nor a defined custom type, in 1010 analysis of the data is limited to low level comparison, e.g., ASCII or binary data comparison.

Figure 11:
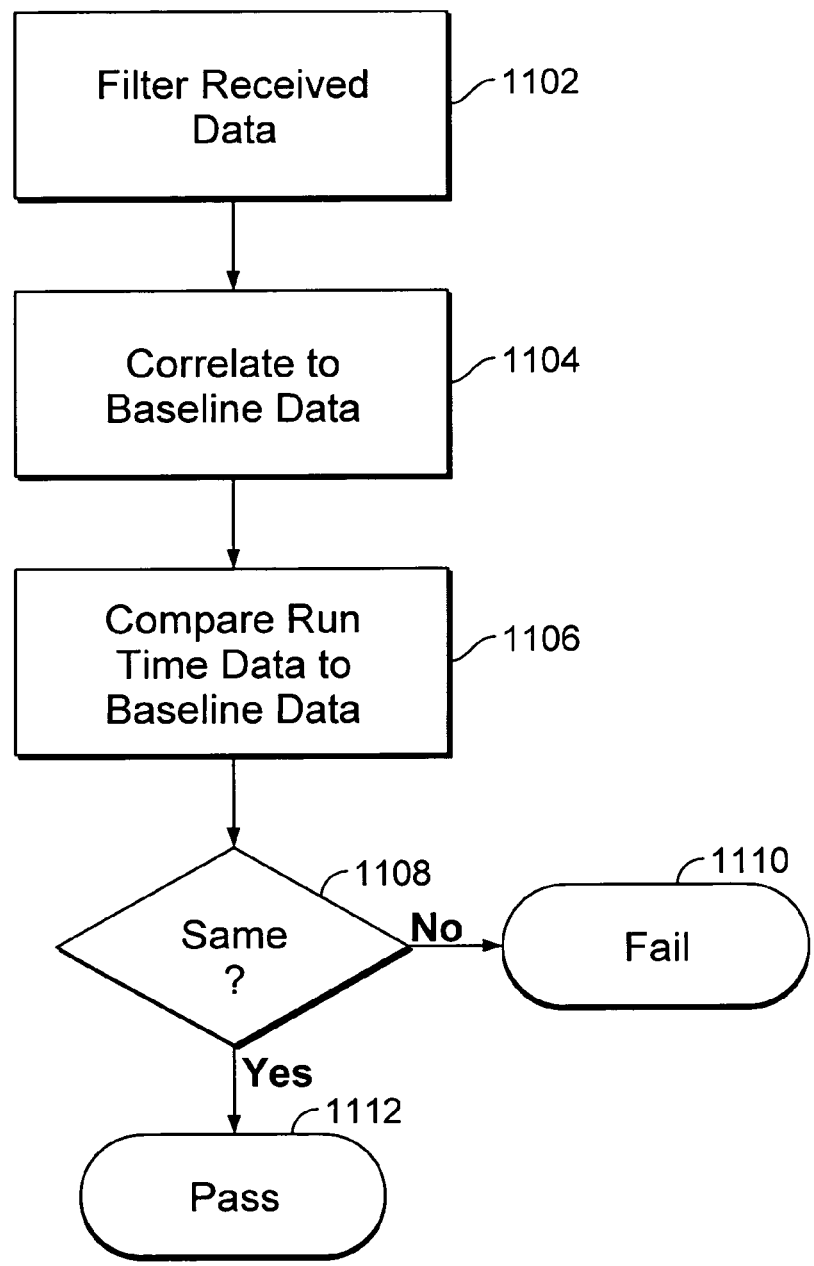
FIG. 11 is a flow chart illustrating a process used in one embodiment to analyze received test runtime output data that is to be compared to corresponding baseline data.

FIG. 11 is a flow chart illustrating a process used in one embodiment to analyze received test runtime output data that is to be compared to corresponding baseline data. In one embodiment, the process of FIG. 11 is used to implement at least in part 910 and/or 914 of FIG. 9, depending on the embodiment. At 1102, the received (and, if applicable, normalized) test runtime output data is filtered. In one embodiment, the filtering comprises identifying in and extracting from the received data one or more data elements to be analyzed (i.e., an inclusion filter). In one embodiment, the filtering comprises excluding from analysis one or more data elements. In one embodiment, one or more exclusion filters may be used to exclude from analysis data elements that may vary from run to run from a corresponding element of baseline data without such deviation from the baseline indicating an error or other problem, e.g., a timestamp, invoice number, and/or other values that may vary validly with time or successive iterations of the process(es) being tested. In 1104, the data identified for inclusion and/or not excluded in 1102 is correlated with the baseline data that corresponds to it. In one embodiment, the correlation performed at 1104 includes using one or more XPATH and/or XQUERY expressions defined by a user to find the baseline data that corresponds to each element of received test runtime data. In one embodiment, it is assumed (or the test platform and/or application may be configured by a user to assume) that the test runtime data is received in the same sequence as the baseline data, and the correlation is based on this assumption. The received data is then compared at 1106 with the corresponding baseline data. If the test runtime data is determined at 1108 to not be the same as the corresponding baseline data (or to not be sufficiently the same as, depending on the data and the embodiment), it is concluded in 1110 that the result for the test (or portion thereof) with which the data is associated is "fail". If the test runtime data is determined at 1108 to be the same as the corresponding baseline data, it is concluded in 1112 that the result for the test (or portion thereof) with which the data is associated is "pass".

Figure 12:
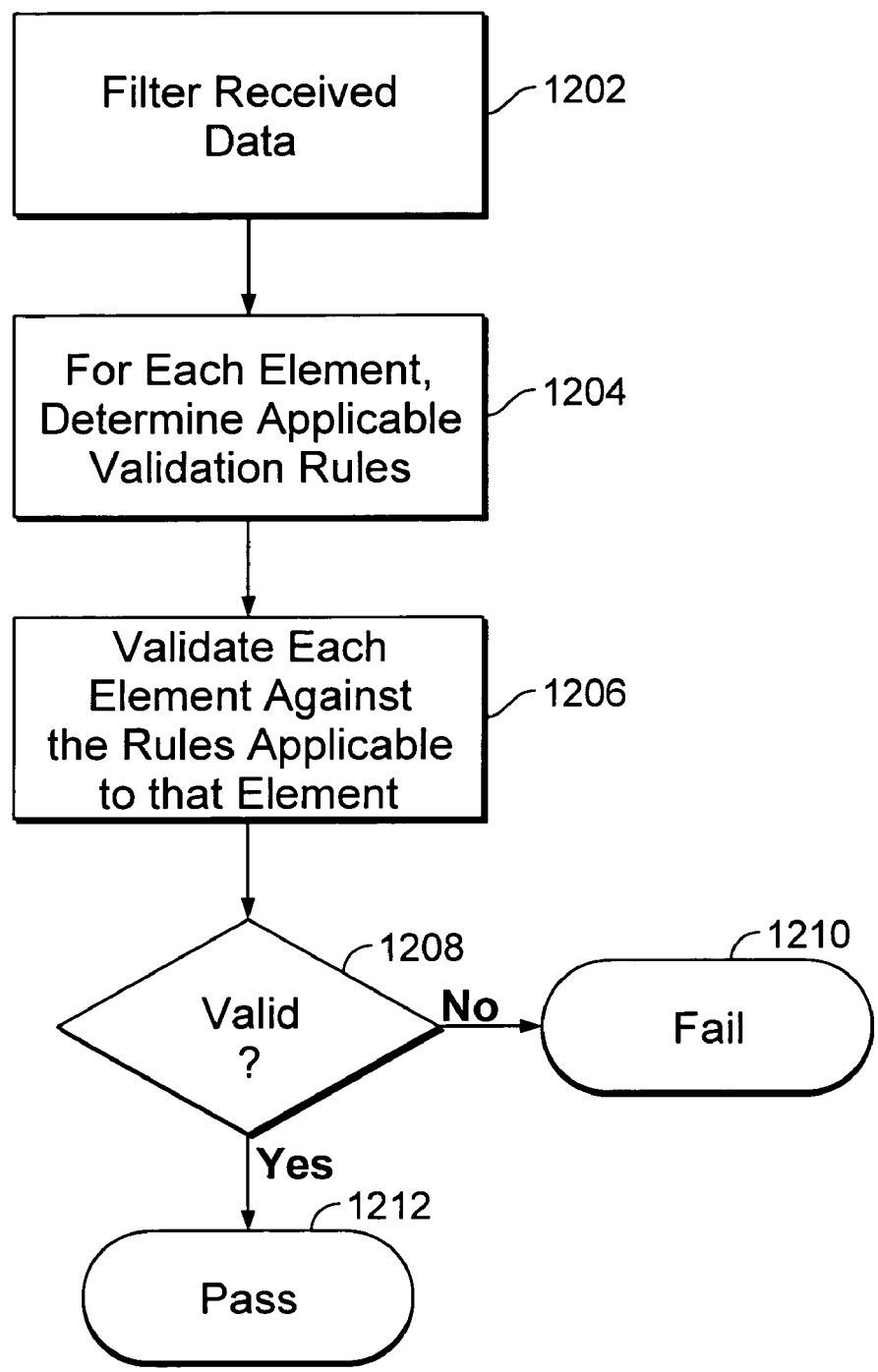
FIG. 12 is a flow chart illustrating a process used in one embodiment to analyze received test runtime output data that is to be validated using one or more validation rules.

FIG. 12 is a flow chart illustrating a process used in one embodiment to analyze received test runtime output data that is to be validated using one or more validation rules. In one embodiment, the process of FIG. 12 is used to implement at least in part 910 and/or 914 of FIG. 9, depending on the embodiment. At 1202, the received (and, if applicable, normalized) test runtime output data is filtered, e.g., as described above in connection with 1102 of FIG. 11. In 1204, the validation rule(s) to be applied to the data identified for inclusion and/or not excluded in 1202 is/are determined. The applicable validation rule(s) is/are applied to the data at 1206. If the test runtime data is determined at 1208 to not be valid, it is concluded in 1110 that the result for the test (or portion thereof) with which the data is associated is "fail". If the test runtime data is determined at 1208 to be valid, it is concluded in 1212 that the result for the test (or portion thereof) with which the data is associated is "pass".

In one embodiment, a test may involve two or more integrated enterprise applications. In such an embodiment, a separate application-specific test connector application (and/or instance thereof) is used to communicate with each subject application involved in the test. In one embodiment, if an error and/or test failure occurs (e.g., runtime output data does not match corresponding baseline date, or runtime output data does not satisfy an applicable validation rule), the error is categorized base on the subject application that caused the error (e.g., the subject application that generate test runtime output data that failed a comparison to baseline and/or application of a validation rule). In one embodiment, this categorization is made by associating the error with the application-specific test connector application used to communicate with the subject application associated with the error. In one embodiment, certain failures may be categorized in a manner not specific to any one subject application, such as failure of the overall test to be completed within a prescribed time in a performance test.

In one embodiment, an "error" associated with a subject application and/or test connector application may be associated with one or more "failures", where a "failure" is a single "fail" event, such as an actual difference between a field in the baseline and runtime output, failure to satisfy a particular validation rule, etc. This approach enables a person analyzing the results to know what failures are grouped together within a given error and more quickly localize and analyze all the problems with a given set of test runtime output data.

In some cases, an error may not have any failures associated with it, such as when a connection cannot be established to a particular subject application. In one embodiment, the test can be configured to stop running after a single failure event, e.g., where a test designer only cares to know that at least one comparison or validation failed and does not need to know whether others also would have occurred had the test continued to run.

Figure 13:
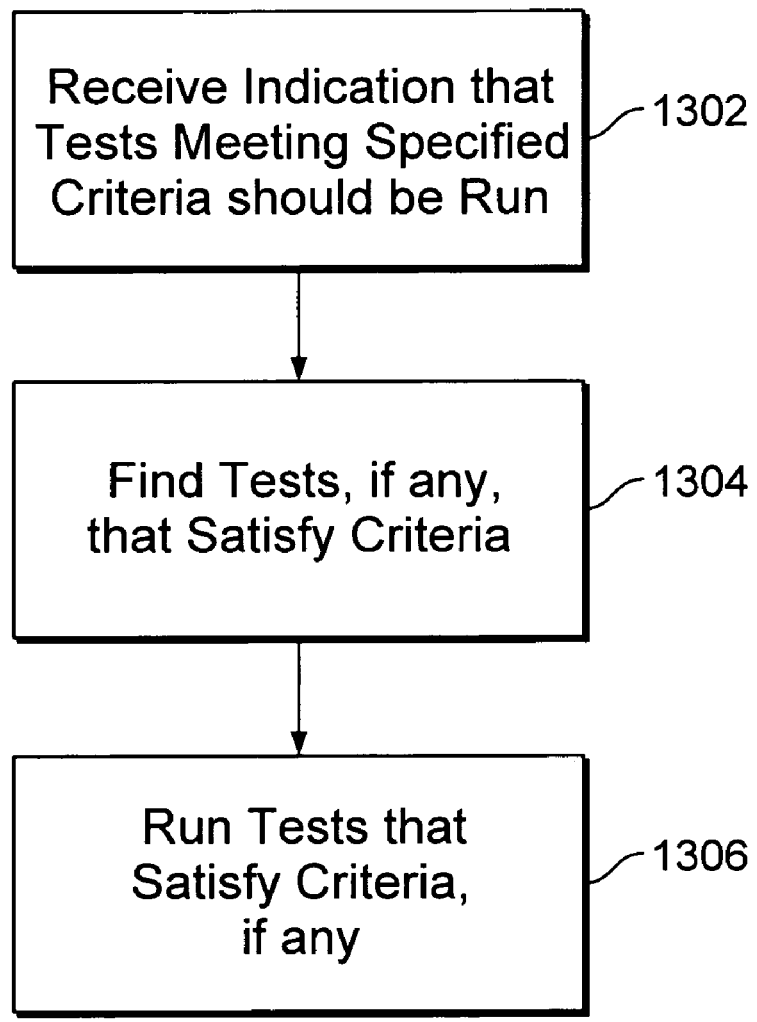
FIG. 13 is a flow chart illustrating a process used in one embodiment to identify and run as a group a set of tests that satisfy one or more criteria.

FIG. 13 is a flow chart illustrating a process used in one embodiment to identify and run as a group a set of tests that satisfy one or more criteria. In one embodiment, the set of tests that satisfy the criteria may include zero, one, or many tests, depending on the configuration, the criteria used, and the tests that have been defined. At 1302, an indication is received that tests meeting one or more specified criteria should be run as a group. In one embodiment, the tests may include tests defined previously by a user and stored, e.g., in the form of an XML configuration or test definition file, in one or more file system directories, a database, and/or other location, repository, or structure. In one embodiment, the criteria may include an identification of the location(s) to be searched, e.g., all test files (e.g., tests, test groups, test projects) found in a specified directory. In one embodiment, additional and/or different criteria may be specified, such as test files that match a regular expression, test files that appear in a list of files to be included, etc. At 1304, tests (or test groups, test projects, etc.) that satisfy the specified criteria are found. In one embodiment, 1304 comprises searching a specified location (e.g., directory) for tests that satisfy the specified criteria (e.g., all test files, those that match a specified regular expression, those that appear on a provided list, etc.). At 1306, the tests determined to satisfy the criteria are run. In one embodiment, a user may specify that the tests be run sequentially, concurrently, and/or in groups of a specified size (e.g., four at a time). In this manner, groups of related tests may be run in a convenient and efficient way.

Figure 14:
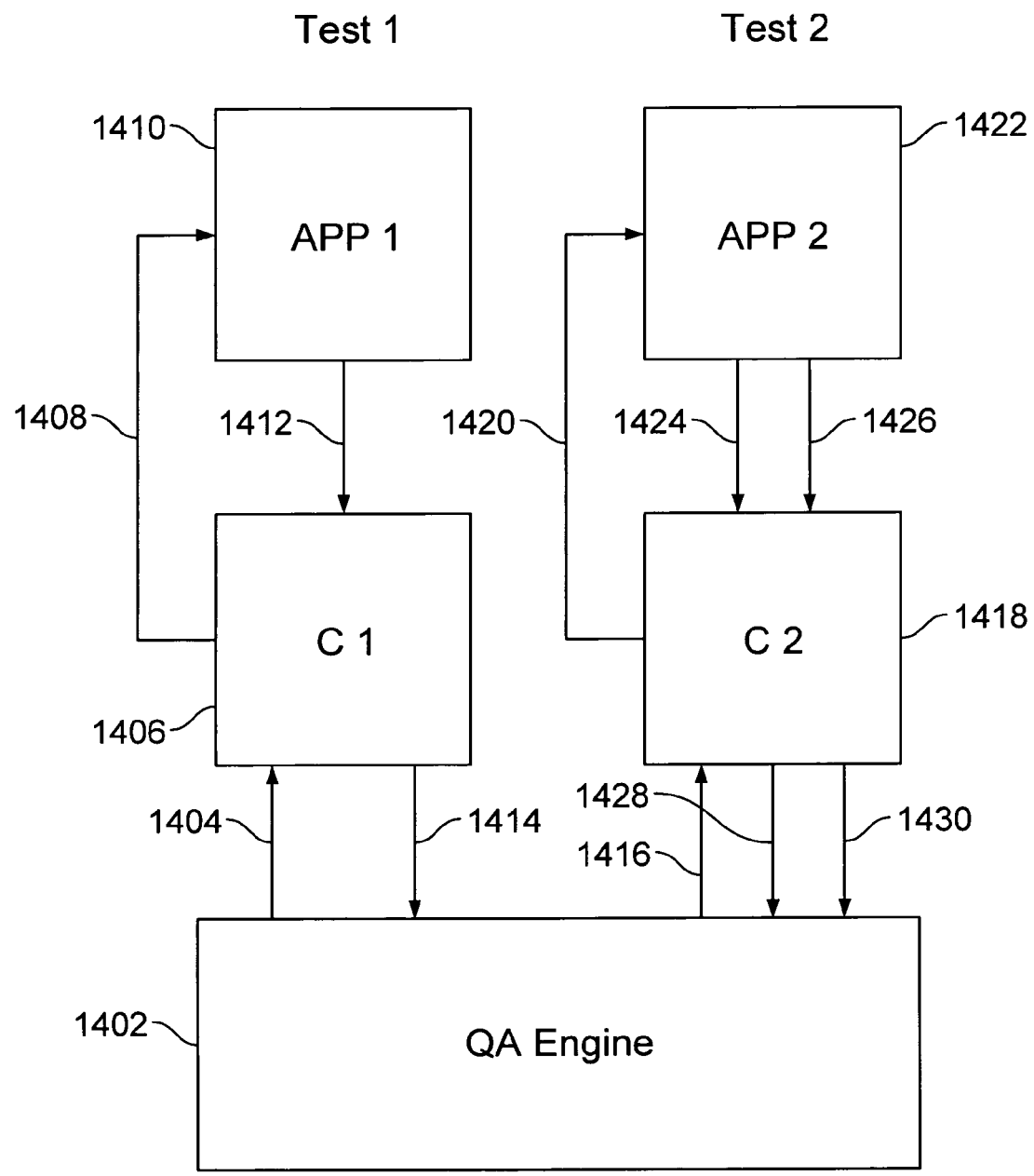
FIG. 14 is a block diagram illustrating an example of multiple tests involving data dependencies being run in sequence as a test chain, as implemented in one embodiment.

FIG. 14 is a block diagram illustrating an example of multiple tests involving data dependencies being run in sequence as a test chain, as implemented in one embodiment. In the example shown, a QA engine 1402 is configured to perform a first test by providing a command (or data input) 1404 to a first test connector 1406. First test connector 1406 is configured to provide to a first application 1410 an input 1408 in a format appropriate for the first application 1410. The first application 1410 processes the input and generates a test runtime output 1412, which is provided to (or obtained by) the first test connector 1406. The first test connector 1406 normalizes the data into a format usable by QA engine 1402 and provides the normalized test runtime output 1414 to QA engine 1402. QA engine 1402 is also configured in the example shown to perform a second test by providing a second command (or data input) 1416 to a second test connector 1418, which is configured to in response provide a second data input 1420 to a second application 1422. The second application 1422 processes the input 1420 and generates two runtime outputs 1424 and 1426, which are normalized by a second connector 1418 prior to being provided to QA engine 1402 as normalized outputs 1428 and 1430.

In the example shown in FIG. 14, it is assumed for purposes of illustration that the value of the second input 1420 is dynamically dependent on the value of the test runtime output 1412 of first application 1412, as generated during the running of the first test. That is, in order for the second test to be run properly and the results understood and analyzed properly, it is necessary for the first test to be run and the input used to run the second test updated based on a result of the first test (e.g., an output value generated during the running of the first test) prior to running the second test. In one embodiment, the QA engine and/or an associated component or process is configured to run the first test and update prior to running the second test an input value associated with the second test based at least in part on an output generated during the running of the first test.

Figure 15:
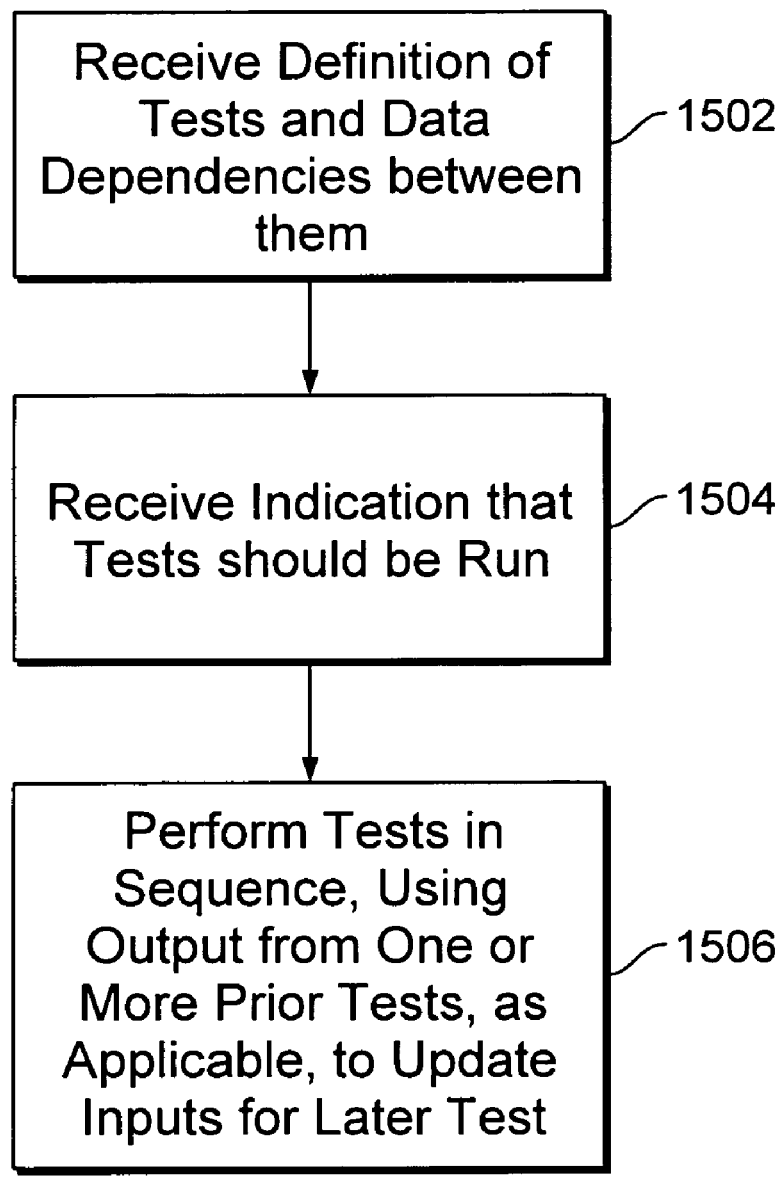
FIG. 15 is a flow chart illustrating a process used in one embodiment to define and run in sequence a chain of tests involving one or more dynamic data dependencies.

FIG. 15 is a flow chart illustrating a process used in one embodiment to define and run in sequence a chain of tests involving one or more dynamic data dependencies. At 1502, a definition of the tests to be included in the test chain and any applicable data dependencies is received. In one embodiment, the definition is received in the form of an XML configuration or test definition file. In one embodiment, data dependencies are defined by defining an update rule comprising an XPATH expression identifying a path to an output data value to be used to update a specified input value associated with the update rule prior to running a test with which the specified input value is associated. At 1504, an indication is received that the test chain (i.e., the tests comprising the chain defined in 1502) should be run. At 1506, the tests associated with the test chain are run in sequence, using the output from one or more tests in the chain, as applicable, to update one or more inputs for tests to be run later in the sequence prior to running such later tests.

Figure 16:
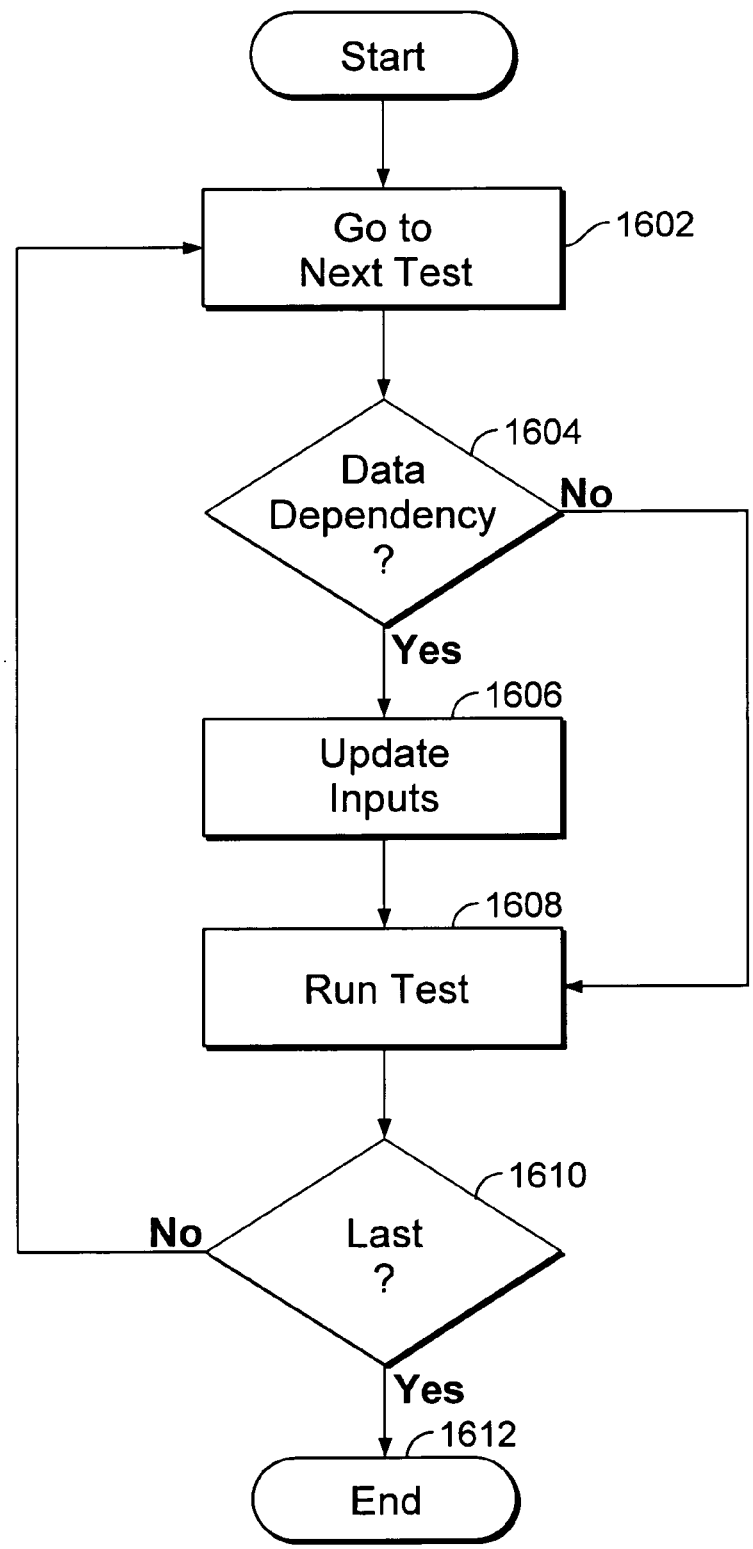
FIG. 16 is a flow chart illustrating a process used in one embodiment to perform in sequence the tests included in a test chain.

FIG. 16 is a flow chart illustrating a process used in one embodiment to perform in sequence the tests included in a test chain. In one embodiment, the process of FIG. 16 is used to implement 1506 of FIG. 15. At 1602, data associated with the next test in sequence is retrieved and processed. In one embodiment, in the first iteration of the process shown in FIG. 16 data associated with the first test in the chain is retrieved and processed at 1602. In 1604, it is determined whether the next test to be performed is associated with any defined dynamic data dependency, i.e., whether any input associated with the test is required to be updated, prior to performing the test, based on an output generated by a previously-run test. If the test is associated with one or more data dependencies, any inputs required to be updated are updated at 1606 prior to running the test at 1608. If no input is required to be updated prior to running the test, 1606 is bypassed and the test is run at 1608. In 1610, it is determined whether the test just run is the last test in the chain. If so, the process ends at 1612. Otherwise, the process returns to 1602 and the next test in the chain is processed, after which the process of FIG. 16 repeats for each test in the chain until the last test has been performed.

Figure 17:
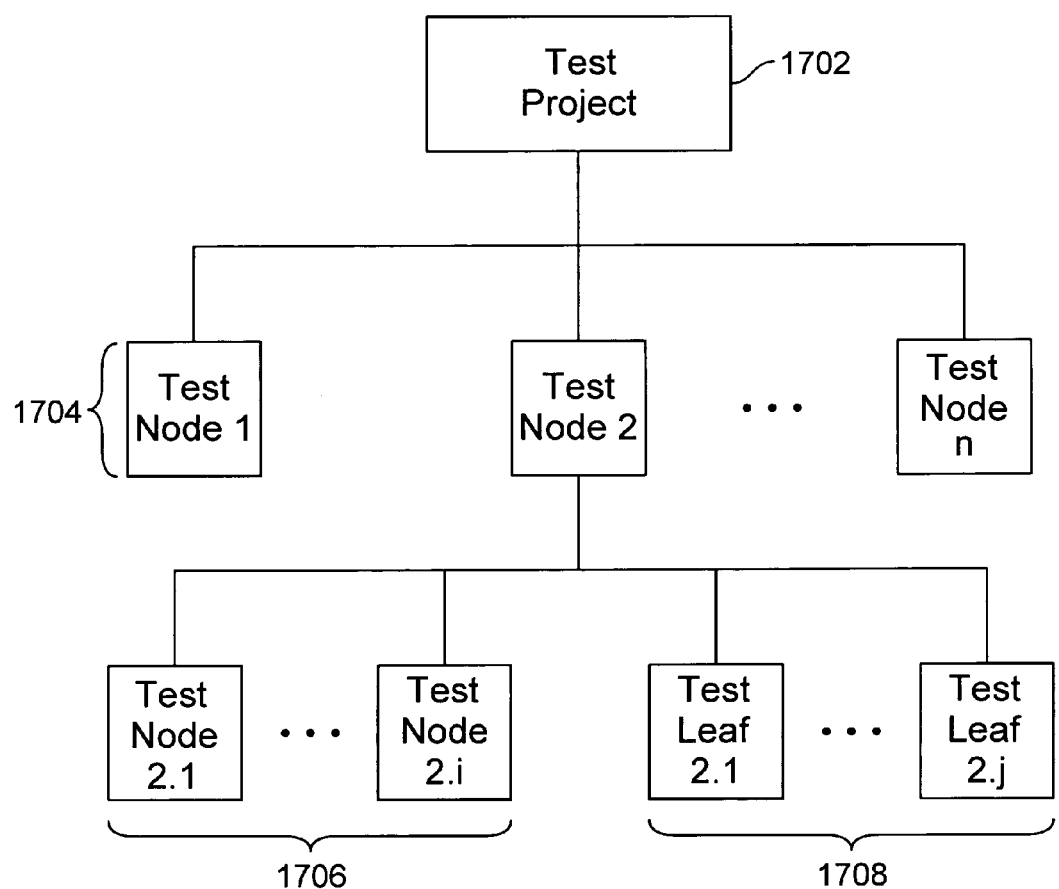
FIG. 17 illustrates a tree structure of a test project configuration file used in one embodiment to configure a test platform and/or application to implement one or more of the techniques described herein.

FIG. 17 illustrates a tree structure of a test project configuration file used in one embodiment to configure a test platform and/or application to implement one or more of the techniques described herein. In one embodiment, the configuration file illustrated in FIG. 17 comprises an XML file. In one embodiment, the configuration file of FIG. 17 comprises an input into QA engine 200 or integration testing system 100. In the example shown, a user defines a test project comprising one or more test nodes 1704, represented in FIG. 17 by test nodes 1 through n. In one embodiment, each node may represent a test, a group of tests, a test chain, a set of tests that satisfy criteria associated with the node, a stress or robustness (hardness) test such as described above, or any other test or related project. The structure illustrated in FIG. 17 allows a test designer to group multiple tests within a group, for example, using applied performance and/or running mode (e.g., sequential or parallel), which indicates how tests are run within a group. Other options for grouping tests may also be included. In one embodiment, each of the test nodes may include one or more children nodes and/or one or more tests. In the example shown, test node 2 includes a plurality of children test nodes 1706, represented in FIG. 17 by test nodes 2.1 to 2.i, and a plurality of tests 1708, represented in FIG. 17 by test leafs 2.1 to 2.j. In one embodiment, each node may have one or more user configurable properties associated with it, including as applicable and without limitation, properties defining a maximum time for operations associated with the node to be completed and whether the operations should be continued to completion even if the maximum time is reached; indicating whether operations associated with the node, e.g., those specified in children test nodes and/or test leafs associated with the node, should be performed sequentially, concurrently, or in groups of a specified size (e.g., four at a time); specifying a location to which results data should be stored; etc. In one embodiment, one or more custom types of test node may be defined, e.g., via a user-defined plug-in.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and
wherein the test connector application is one of a plurality of test connector applications, each specific to a corresponding subject application for which testing is supported.

2. A method as recited in claim 1, wherein the generic form in which the definition of the test is received comprises XML data.

3. A method as recited in claim 1, wherein the generic form in which the definition of the test is received comprises a file.

4. A method as recited in claim 1, wherein the generic form in which the definition of the test is received comprises a data stream.

5. A method as recited in claim 1, wherein the subject application comprises two or more integrated applications.

6. A method as recited in claim 1, wherein the subject application comprises two or more integrated subject applications and performing the test comprises using a separate test connector application specific to each of at least a subset of said two or more integrated subject applications to do with respect to the integrated subject application with which it is associated at least one of (1) convert an input data to be supplied to the subject application during the test from a generic data format not specific to the subject application into an application-specific data format associated with the subject application, if the application-specific data format is different than the generic data format and (2) normalize a test runtime output data received from the subject application in the application-specific data format into the generic data format not specific to the subject application, if the application-specific data format is different than the generic data format.

7. A method as recited in claim 1, wherein the test comprises one of a set of tests configured to be performed as a group.

8. A method as recited in claim 1, wherein performing the test comprises correlating a test runtime output data received during the test with a corresponding baseline data associated with the test.

9. A method as recited in claim 1, wherein performing the test comprises comparing a test runtime output data received during the test to a corresponding baseline data associated with the test.

10. A method as recited in claim 1, wherein performing the test comprises comparing a test runtime output data received during the test to a corresponding baseline data associated with the test and taking responsive action if it is determined the test runtime output data is different than the corresponding baseline data.

11. A method as recited in claim 1, further comprising generating a set of baseline data associated with the test by running a baseline iteration of the test using a predefined test case and capturing one or more elements of baseline data generated during the baseline iteration of the test.

12. A method as recited in claim 1, wherein performing the test comprises applying a data validation rule to a test runtime output data received during the test.

13. A method as recited in claim 12, wherein the data validation rule specifies a permitted value.

14. A method as recited in claim 12, wherein the data validation rule comprises a date validation rule.

15. A method as recited in claim 14, wherein the date validation rule specifies a permitted range of dates.

16. A method as recited in claim 14, wherein the date validation rule uses an operator to specify a permitted date or range of dates.

17. A method as recited in claim 14, wherein the date validation rule comprises a list of permitted dates.

18. A method as recited in claim 14, wherein the date validation rule comprises a relative date value.

19. A method as recited in claim 1, further comprising deriving a validation rule associated with the test by performing a baseline iteration of the test using a predefined test case, capturing one or more elements of baseline data generated during the baseline iteration of the test, and deriving the validation rule based at least in part on at least a subset of the one or more elements of captured baseline data.

20. A method as recited in claim 1, wherein the test comprises a performance test.

21. A method as recited in claim 1, wherein the test comprises a performance test in which it is determined whether the test is completed outside of a prescribed time limit associated with the test.

22. A method as recited in claim 1, wherein the test comprises a stress test.

23. A method as recited in claim 1, wherein the test comprises a stress test in which the test is repeated a predefined number of times.

24. A method as recited in claim 1, wherein the test comprises a robustness test.

25. A method as recited in claim 1, wherein the test comprises a robustness test in which the test is repeated a prescribed number of times with at least one input being changed in each successive iteration.

26. A method as recited in claim 1, wherein the test connector application is selected by a user from a plurality of connector applications, each specific to a corresponding subject application for which testing is supported.

27. A method as recited in claim 1, wherein the test connector application is selected automatically from a plurality of connector applications, each specific to a corresponding subject application for which testing is supported.

28. A method as recited in claim 1, wherein the generic data format comprises XML.

29. A method as recited in claim 1, wherein the test connector application is configured to do at least one of (1) receive XML data from the subject application and (2) provide XML data to the subject application.

30. A method as recited in claim 1, wherein the connector application is configured to do at least one of (1) receive a file generated by the subject application and (2) provide a file as input to the subject application.

31. A method as recited in claim 1, wherein the connector application is configured to do at least one of (1) receive from the subject application a message comprising data generated by the subject application and (2) provide to the subject application a message comprising input data to be provided to the subject application.

32. A method as recited in claim 1, further comprising receiving an indication that tests, if any, that satisfy one or more specified criteria should be run as a group and in the event the test satisfies the criteria performing the test.

33. A method as recited in claim 32, wherein the criteria comprises a location in which the definition is stored.

34. A method as recited in claim 32, wherein the criteria comprises a directory in which the definition is stored.

35. A method as recited in claim 32, wherein the criteria comprises a database in which the definition is stored.

36. A method as recited in claim 32, wherein the criteria comprises a regular expression.

37. A method as recited in claim 32, wherein the criteria comprises a list of test definitions.

38. A method as recited in claim 1, wherein the application-specific data format comprises a non-standard data format.

39. A method as recited in claim 1, wherein the application-specific data format comprises a complex data format.

40. A method as recited in claim 1, wherein the application-specific data format comprises a custom complex data format.

41. A method as recited in claim 1, further comprising generating a test result associated with the test.

42. A method as recited in claim 41, wherein the test result is generated in a data format suitable for use by a user associated with the test.

43. A method as recited in claim 41, wherein the test result is generated in XML.

44. A method as recited in claim 41, wherein the test result is written to a user-specified location.

45. A method as recited in claim 41, wherein the test result is associated with the test connector to facilitate localization and troubleshooting of errors or failures.

46. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and
wherein the generic form in which the definition of the test is received comprises a file having a tree structure having one or more nodes, each of said one or more nodes being associated with one or more tests to be performed with respect to one or more subject applications associated with the node.

47. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application if the application-specific data format is different than the generic data format; performing the test comprises applying a data validation rule to a test runtime output data received during the test; and
the data validation rule specifies a permitted range of values.

48. A method as recited in claim 47, wherein the data validation rule comprises a regular expression.

49. A method as recited in claim 47, wherein the data validation rule comprises a custom data validation rule.

50. A method as recited in claim 47, wherein the data validation rule comprises a custom JAVA class.

51. A method as recited in claim 47, wherein the test runtime output data comprises a data stream and applying a data validation rule comprises stream validation.

52. A method as recited in claim 51, wherein the stream validation comprises performing a text search.

53. A method as recited in claim 52, wherein the text search is performed using Lucene or another stream text search tool.

54. A method as recited in claim 51, wherein the stream validation comprises a custom process defined by a user.

55. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and
wherein the test comprises a performance test in which it is determined whether the test is completed within a prescribed time limit associated with the test.

56. A method as recited in claim 55, wherein the test is run to completion even if it is not completed within the prescribed time limit if a user has indicated the test should be run to completion even if it is not completed within the prescribed time limit.

57. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application if the application-specific data format is different than the generic data format; and
wherein the test comprises a first test, the subject application comprises a first subject application, the definition comprises a first definition, and the method further comprises:
receiving in the generic form a second definition of a second test to be performed on a second subject application; and
receiving an update rule defining a dynamic dependency between a dependent input to be supplied to the second application as part of the second test and a corresponding output generated by the first subject application when the first test is run and requiring that the value of the dependent input be updated based at least in part on the value of the corresponding output at a time subsequent to the corresponding output being generated during the running of the first test and prior to the dependent input being provided to the second subject application during the running of the second test.

58. A method as recited in claim 57, wherein performing the test comprises doing in the order listed:
performing the first test;
updating the dependent input based on the value of the corresponding output as generated during the running of the first test; and
performing the second test.

59. A method as recited in claim 57, wherein the update rule comprises an XPATH or XQUERY expression identifying a location associated with the dependent input.

60. A method as recited in claim 57, wherein the update rule comprises an XPATH expression identifying a location associated with the corresponding output on which the dependent input depends.

61. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and
wherein performing the test comprises automatically setting a testing environment associated with the test to an initial condition associated with the test.

62. A method as recited in claim 61, wherein performing the test comprises automatically cleaning up a testing environment associated with the test to restore the testing environment at least in part to a condition in which it was prior to the test being run.

63. A method of testing an application, comprising:
receiving in a generic form not specific to a subject application to be tested a definition of a test to be performed on the subject application; and
performing the test;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and
wherein the application-specific data format comprises a the non-standard data format that is associated with a custom data format.

64. A method as recited in claim 63, wherein the custom data format is associated with a user-defined plug-in.

65. A method as recited in claim 63, wherein performing the test comprises using a custom data type comparison plug-in to compare a test runtime output data to a corresponding element of baseline data.

66. A method as recited in claim 63, wherein performing the test comprises using a custom data type correlation plug-in to correlate a test runtime output data to a corresponding element of baseline data.

67. A method as recited in claim 63, wherein performing the test comprises using a custom data type filter plug-in to filter a set of test runtime output data to identify a subset of the set of test runtime output data to be compared to corresponding elements of baseline data.

68. A method as recited in claim 63, wherein performing the test comprises using a custom data type transformation plug-in to transform a test runtime output data into an accessible form.

69. A method as recited in claim 68, wherein transforming the test runtime output data comprises decrypting the test runtime output data.

70. A method of testing an application, comprising:
receiving in a generic form not specific to a subject application to be tested a definition of a test to be performed on the subject application;
performing the test;
receiving, in the event the subject application fails one or more aspects of the test, one or more failure notifications, each associated with a failure event; and
associating related ones of said one or more failure notifications, if any, together and assigning an error identification to each associated group of failure notifications and to each individual failure notification that is not associated with any other failure notification;
wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format.

71. A method as recited in claim 70, wherein the test involves a plurality of subject applications, each of which having an application-specific test connector application associated with it, and further comprising associating each error identification that is specific to a particular subject application with a subject application associated with the failure notification(s) associated with the error identification.

72. A method as recited in claim 71, wherein associating each error identification with a subject application comprises associating each error identification with an application-specific test connector application associated with the failure notification(s) associated with the error identification.

73. A system for testing an application, comprising:
a processor configured to:
receive in a generic form not specific to a subject application to be tested a definition of a test to be performed on the subject application; and
perform the test; and
a memory configured to store the definition;
wherein performing the test comprises exchanging data with the subject application, as required to perform the test, using a connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and wherein the test connector application is one of a plurality of test connector applications, each specific to a corresponding subject application for which testing is supported.

74. A system for testing an application, comprising:

a quality assurance engine configured to:

receive in a generic form not specific to a subject application to be tested a definition of a test to be performed on the subject application; and perform the test; and a test connector application configured to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and wherein the test connector application is one of a plurality of test connector applications, each specific to a corresponding subject application for which testing is supported.

75. A computer program product for testing an application, the computer program product being embodied in a computer readable medium and comprising computer instructions for:

receiving in a generic form not specific to a subject application to be tested a definition of a test to be performed on the subject application; and performing the test;

wherein performing the test comprises exchanging data with the subject application, as required to perform the test, using a test connector application associated with the subject application to do at least one of (1) convert an input data to be supplied to the subject application during the test from a generic data format not specific to the subject application into an application-specific data format associated with the subject application, if the application-specific data format is different than the generic data format and (2) normalize an output data received from the subject application in the application-specific data format into the generic data format not specific to the subject application, if the application-specific data format is different than the generic data format; and wherein the test connector application is one of a plurality of test connector applications, each specific to a corresponding subject application for which testing is supported.

* * * * *

UNITED STATES PATENT AND TRADEMARK OFFICE
CERTIFICATE OF CORRECTION

PATENT NO.         : 7,421,621 B1                                    Page 1 of 1
APPLICATION NO.    : 10/943778
DATED              : September 2, 2008
INVENTOR(S)        : Gustavo Zambrana It is certified that error appears in the above-identified patent and that said Letters Patent is hereby corrected as shown below:

Claim 47
Column 19, line 43 delete "subject application if the" and insert -- subject application, if the --

Claim 57
Column 20, line 41 delete "subject application if the" and insert -- subject application, if the --

Signed and Sealed this

Thirteenth Day of October, 2009

David J. Kappos
*Director of the United States Patent and Trademark Office*